United States Patent [19]
Wellman et al.

[11] Patent Number: 6,009,357
[45] Date of Patent: Dec. 28, 1999

[54] METHOD AND APPARATUS FOR MONITORING THE PROPER OPERATION OF A CONTROL SYSTEM FOR MATERIALS HANDLING VEHICLES

[75] Inventors: Timothy A. Wellman, Coldwater; Ned E. Dammeyer, New Bremen; Walter Conley, III, St. Marys, all of Ohio

[73] Assignee: Crown Equipment Corporation, New Bremen, Ohio

[21] Appl. No.: 08/236,091

[22] Filed: May 2, 1994

Related U.S. Application Data

[62] Division of application No. 07/682,284, Apr. 9, 1991, Pat. No. 5,343,145.

[51] Int. Cl.⁶ ..................................................... B62D 1/24
[52] U.S. Cl. .............................. 701/23; 701/24; 180/168; 340/905
[58] Field of Search .................... 364/424.02, 424.01, 364/823, 846, 148; 180/168, 167; 324/246, 251, 255, 256, 260, 529, 207.2, 202, 210, 218, 158 R, 326, 345; 330/6; 340/988; 701/23, 24, 41

[56] References Cited

U.S. PATENT DOCUMENTS

| | | | |
|---|---|---|---|
| 3,408,493 | 10/1968 | Westover et al. | 246/249 |
| 3,493,923 | 2/1970 | Stevens et al. | 340/32 |
| 3,669,207 | 6/1972 | Fellgett et al. | 180/168 |
| 4,084,135 | 4/1978 | Enabnit | 324/202 |
| 4,219,805 | 8/1980 | Magee et al. | 340/631 |
| 4,401,181 | 8/1983 | Schwarz | 180/168 |
| 4,465,155 | 8/1984 | Collins | 180/169 |
| 4,491,794 | 1/1985 | Daley et al. | 324/158 R |
| 4,514,687 | 4/1985 | Van Husen | 324/228 |
| 4,613,804 | 9/1986 | Swenson | 180/168 |
| 4,639,666 | 1/1987 | Strosser et al. | 324/202 |
| 4,656,406 | 4/1987 | Houskamp | 180/167 |
| 4,714,124 | 12/1987 | Laib | 180/168 |
| 4,716,530 | 12/1987 | Ogawa et al. | 364/424.02 |
| 4,800,978 | 1/1989 | Wasa et al. | 180/169 |
| 4,829,248 | 5/1989 | Loubier | 324/207.2 |
| 4,831,362 | 5/1989 | Tsaprazis | 340/515 |
| 4,908,557 | 3/1990 | Sudare et al. | 318/587 |
| 4,990,841 | 2/1991 | Elder | 364/424.02 |
| 5,036,935 | 8/1991 | Kohara | 364/424.01 |
| 5,189,612 | 2/1993 | Lemercier et al. | 364/424.02 |
| 5,258,911 | 11/1993 | Wellman et al. | 364/424.01 |

FOREIGN PATENT DOCUMENTS

| | | |
|---|---|---|
| 0092171 | 10/1983 | European Pat. Off. . |
| 0278853 | 8/1988 | European Pat. Off. . |
| 3034659 | 5/1982 | Germany . |
| 257520 | 6/1988 | Germany . |
| 2075733 | 11/1981 | United Kingdom . |

OTHER PUBLICATIONS

Soviet Inventions Illustrated, Section EI, Week E06, Mar. 24, 1982.

Soviet Inventions Illustrated, Section EI, Week D11, Apr. 22, 1981.

Crowe, J.C.; Calibration of Eddy Current Systems with Simulated Signals, *Materials Evaluation*, Sep. 1977, pp. 59–64.

*Primary Examiner*—Tan Nguyen
*Attorney, Agent, or Firm*—Killworth, Gottman, Hagan & Schaeff LLP

[57] ABSTRACT

The operational fitness of a magnetic sensor for detecting buried magnets can be tested from time to time by an electromagnet installed in proximity to the sensor. The electromagnet is a small coil of wire mounted near the sensor, such as a Hall effect device, which when energized, generates a test magnetic field. The analog output of the sensor is compared with preestablished values when the electromagnet is energized to verify the proper operation of the sensor; it is also compared with preestablished values when sensing buried magnets to confirm operation of the sensor, the strength of the buried magnet, and the alignment of the sensor with respect to the magnet. A threshold detector senses the output of the sensor to indicate when a magnetic field is detected, and the peak analog output of the sensor is stored and compared to a reference after the sensor passes the magnet. The sensors are normally tested whenever the vehicle is initially powered up or after the vehicle has been stopped for a predetermined time.

10 Claims, 24 Drawing Sheets

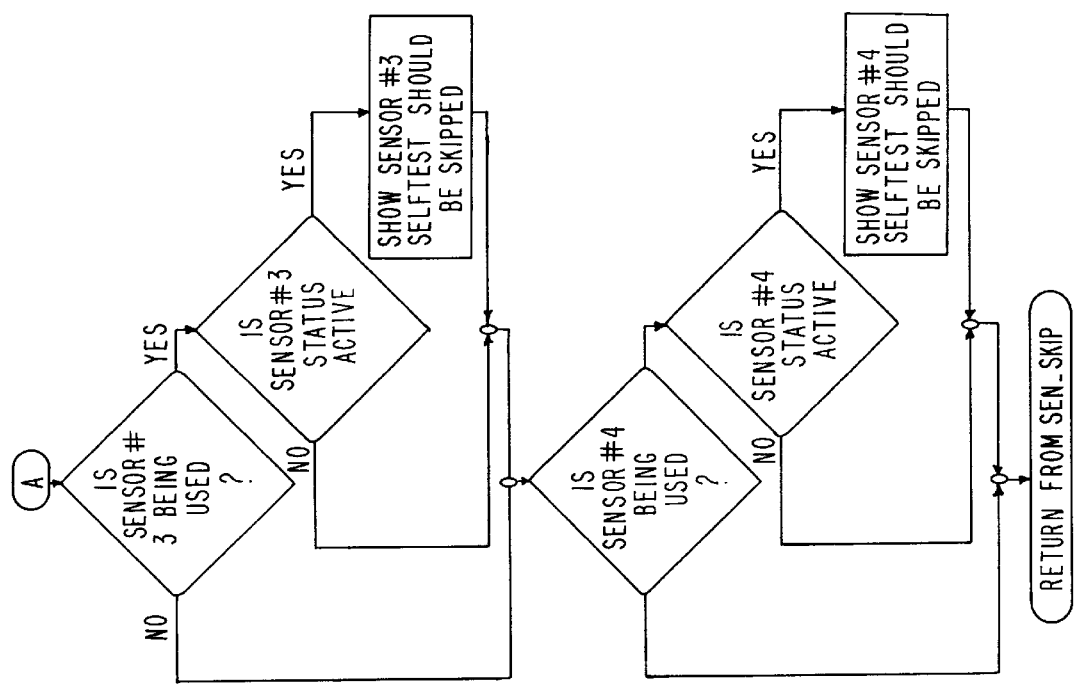
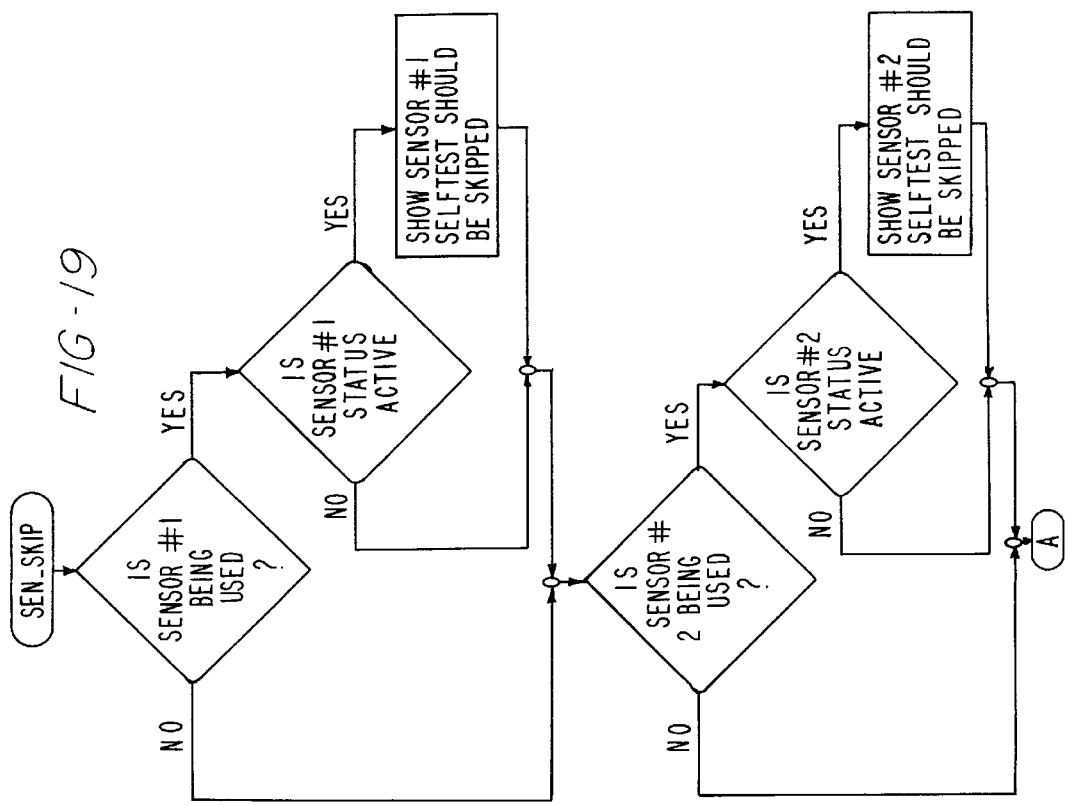
FIG-19

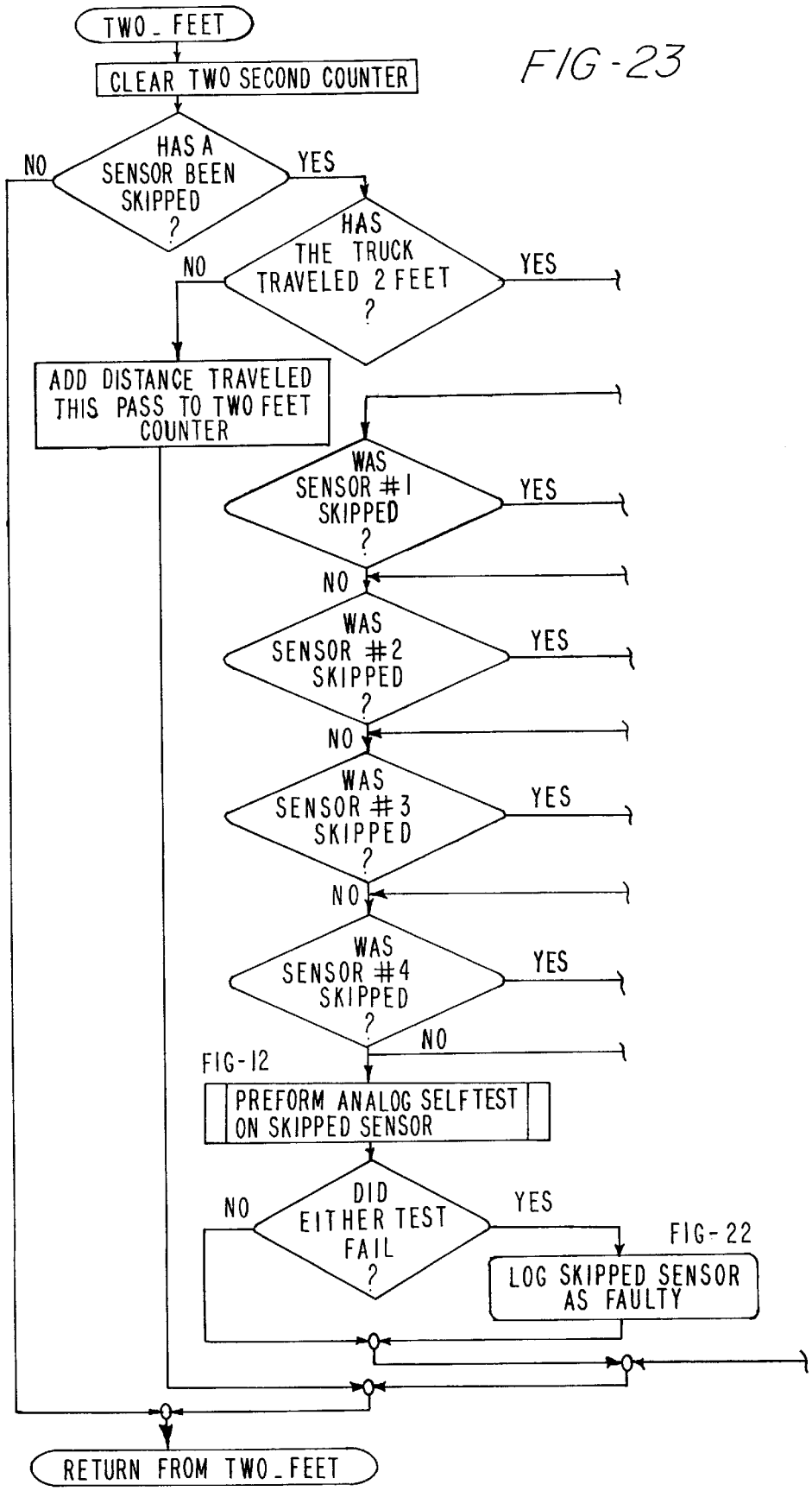

METHOD AND APPARATUS FOR MONITORING THE PROPER OPERATION OF A CONTROL SYSTEM FOR MATERIALS HANDLING VEHICLES

This application is a division of application Ser. No. 07/682,284, filed Apr. 9, 1991, now U.S. Pat. No. 5,343,145.

BACKGROUND OF THE INVENTION

This invention relates to a method and apparatus for determining the proper operation of an end-of-aisle detector system.

Permanent magnets have commonly been embedded in the floor of warehouses that employ either wire or rail guided vehicles in order to indicate various locations, such as the end of an aisle, the beginning of a spur, or some other location where control action of the vehicle is required. In many prior art vehicles, reed switches have been used to indicate whenever the vehicle passes over one of these magnets.

In wire guidance systems, a wire is buried in the floor, and that wire is normally energized with an alternating frequency current. If the signal from the wire is lost for any reason, then action (usually braking) is taken to prevent further unattended movement of the vehicle and thereby protect the vehicle from damage.

Prior to the vehicle acquiring a signal from the buried wire, the sensors may be checked for proper operation by means of a wire permanently placed in proximity to the sensors. A generator causes a test current of the same frequency to be passed through this wire to create a simulated wire guide path signal having essentially the same magnitude as the buried wire. If this test signal is detected, and the sensors coils and associated amplifiers provide the correct output, then this circuit is deemed functional and a software flag is created to indicate that the hardware is installed and working. This sensor circuit may be checked from time to time, under the direction of the guidance controller, to verify that all is working properly. A circuit of this type is described in copending United States patent application Ser. No. 446,902, filed Dec. 6, 1989, and assigned to the same assignee as the present invention.

However, since a buried magnet is detected only occasionally, there is no continuous output from the magnet detector on which to rely to indicate continued reliable operation of the detector. Clearly, it would be desirable to have some means to determine whether the detector and its associated circuit continue to be functional.

SUMMARY OF THE INVENTION

In the present invention, a buried magnet sensor is provided with means for checking its operational fitness from time to time. The sensor is preferably a Hall effect device that includes an electromagnet permanently installed in proximity to the active element. The electromagnet, preferably in the form of a small coil of wire mounted in the same housing as the Hall effect device, when energized, generates a test magnetic field at the Hall effect device. While the electromagnet is energized, the output from the Hall effect device is measured to determine if it is above a predetermined magnitude.

Both during the self-test procedure, while the electromagnet is energized, and during normal operations, the absolute or analog value of the output signal from the Hall effect device is compared to values previously established during calibration of the detector, and if these values are at least as great as the previously established value, then it passes this part of the test; otherwise a failure mode will be indicated.

It is therefore an object of this invention to provide a novel method of determining the proper operation of a Hall effect device installed on a materials handling vehicle for the purpose of detecting a magnet buried in the floor that indicates a specific location, such as the end of an aisle, the method including the steps of placing an electromagnetic coil in proximity to the Hall effect device to provide a simulated signal, passing a current through said coil at specified times to produce a magnetic field at location of the Hall effect device that simulates a buried magnet, and determining whether the magnetic field generated by said coil is detected by the Hall effect device.

It is further object of this invention to provide an apparatus for use with a materials handling vehicle for detecting the presence of a buried magnet, said apparatus including a Hall effect device, and an electromagnetic coil placed in proximity to said Hall effect device for generating a test magnetic field having a field strength that simulates the magnetic field produced by a buried magnet whenever an electrical current is passed therethrough.

It is a still further object of this invention to provide, in a materials handling vehicle of the type that includes an end of aisle control system and means for sensing the presence of buried magnets that indicate specific locations along the path of a buried wire, an improvement including a housing containing the buried magnet sensing means, an electromagnetic coil in said housing, a control circuit, means responsive to said control circuit for generating a test, magnetic field in the presence of the buried magnet sensing means by passing a current through said coil to produce a magnetic field having a strength that simulates the field produced by a buried magnet, and means for sensing whether the output of the buried magnet sensing means in response to the test magnetic field is above a predetermined magnitude.

It is still a further object of this invention to provide, in a materials handling vehicle of the type that includes means for sensing the presence of buried magnets that indicate specific locations along the path of the vehicle, an improvement including plurality of buried magnet sensing means, threshold detector means for indicating which of said sensing means has detected a magnetic field, means for detecting the peak analog output of said sensing means, means for comparing the peak analog output to a predetermined reference, and means for indicating when the peak analog output from said sensing means is below said predetermined reference.

It is yet a further object of this invention to provide a method of testing the operability of an end of aisle control system wherein a plurality of sensors are positioned on an operator controlled materials handling vehicle for sensing floor mounted magnets, the method comprising the steps of initiating a testing sequence at predetermined occasions, determining whether any sensor has an output representing the presence of a magnet and indicating such sensor is being active, testing each sensors not indicated as being active by creating a momentary test magnetic field in the presence of each sensor, determining the strength of magnetic field detected by each sensor, and determining whether the sensor output is above a predetermined level, for any sensor previously indicating active, reinitiating the test of that sensor after the vehicle has traveled a predetermined distance, and disabling the aisle guidance system if any sensor fails to perform properly.

BRIEF DESCRIPTION OF THE INVENTION

FIG. 8 is the overall flow chart while

Figure 9:
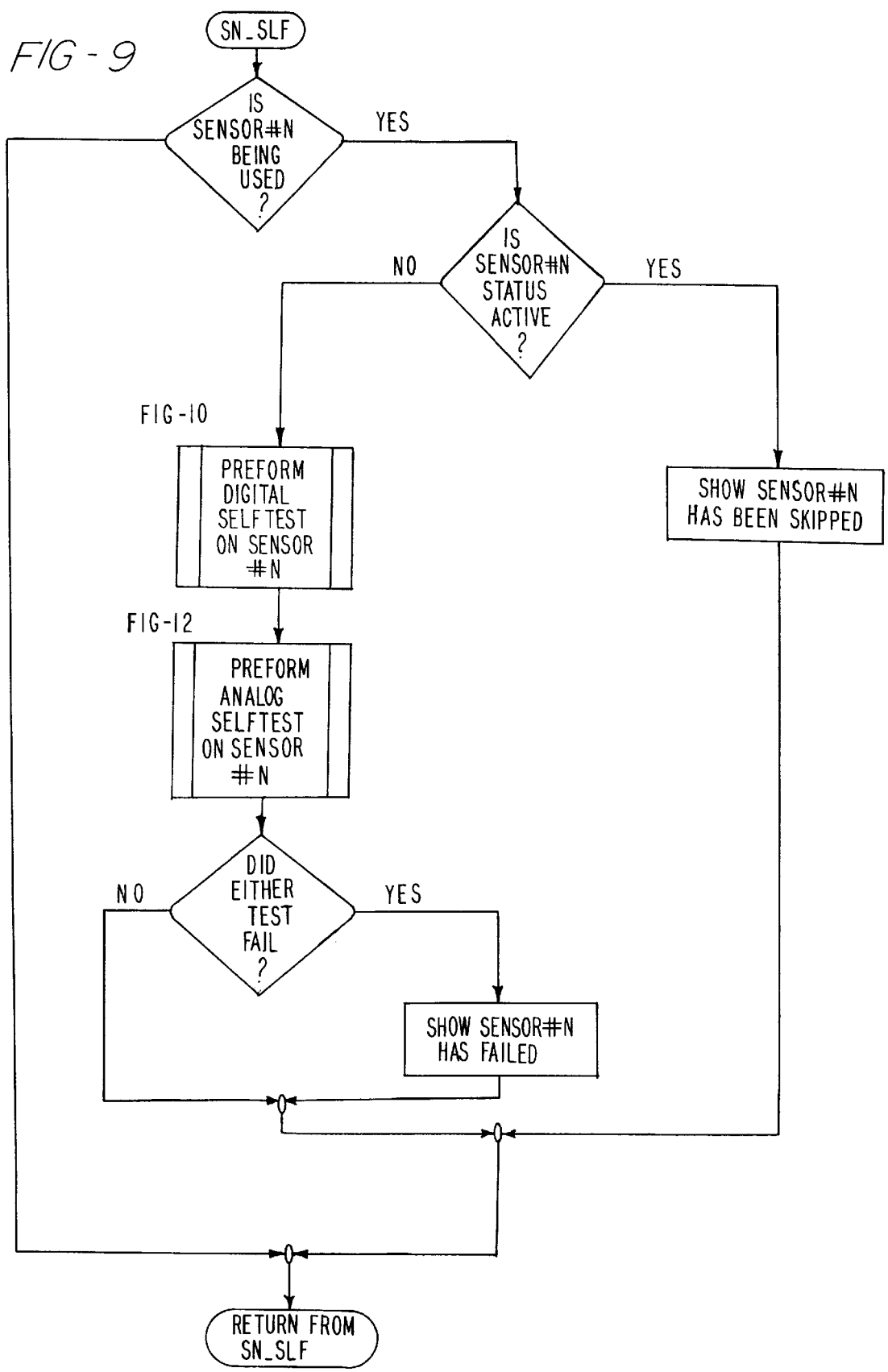
Figure 10:
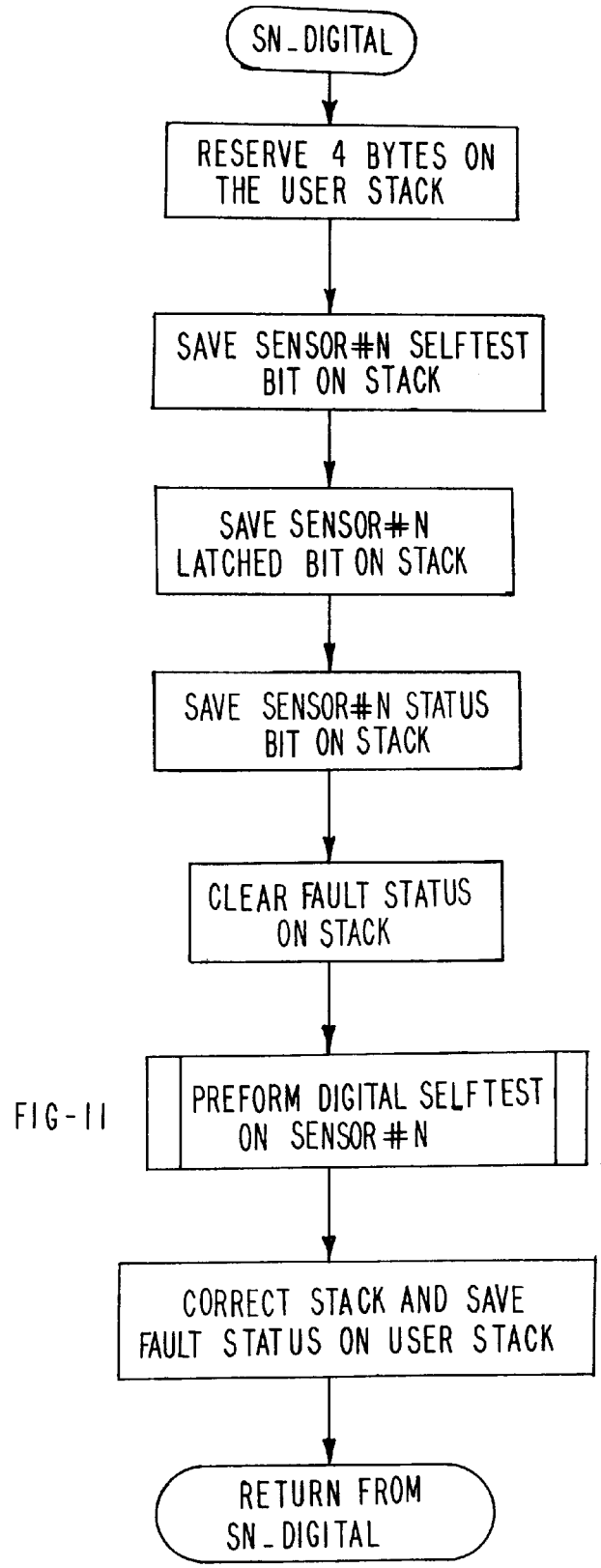
Figure 11:
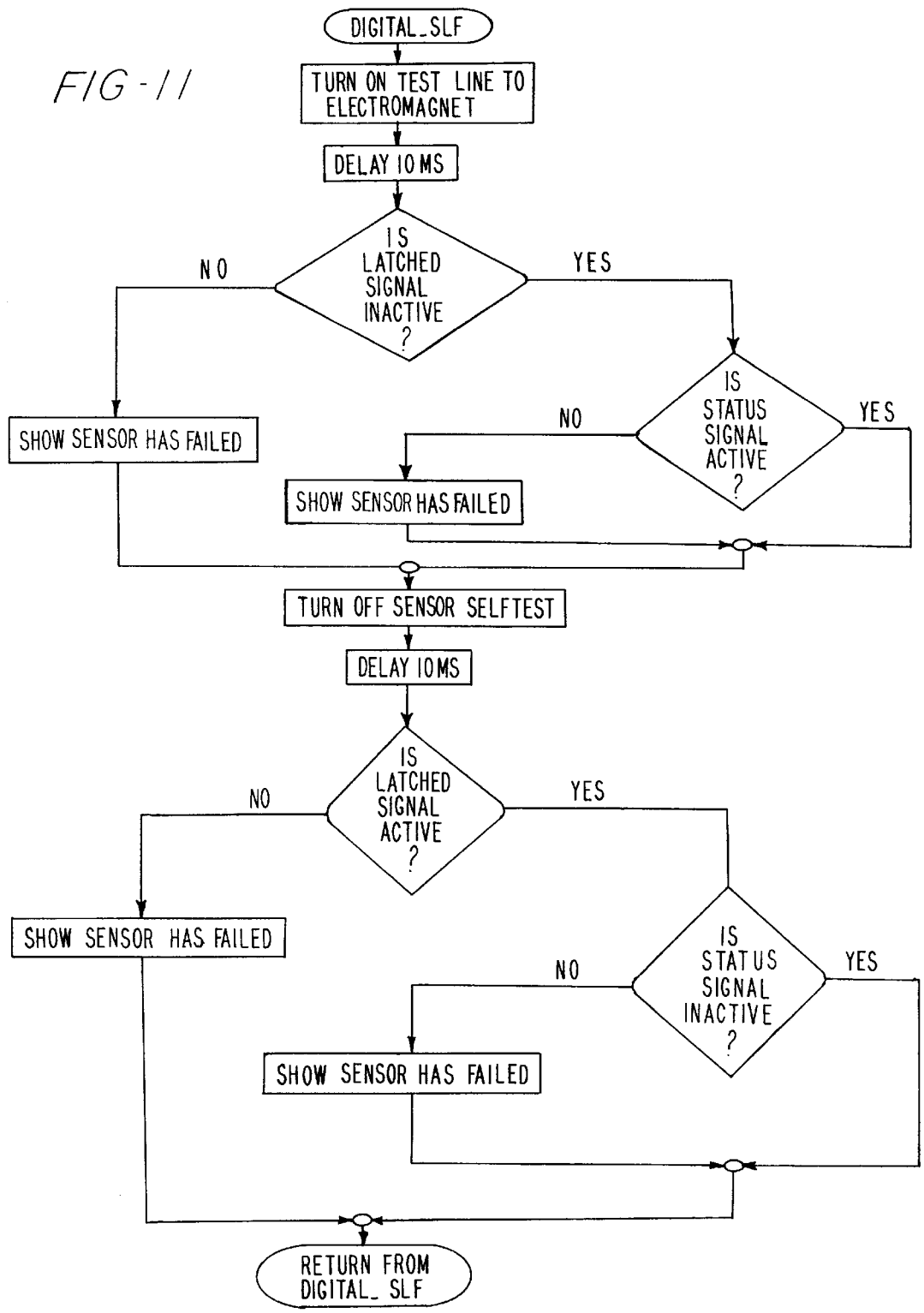
Figure 12:
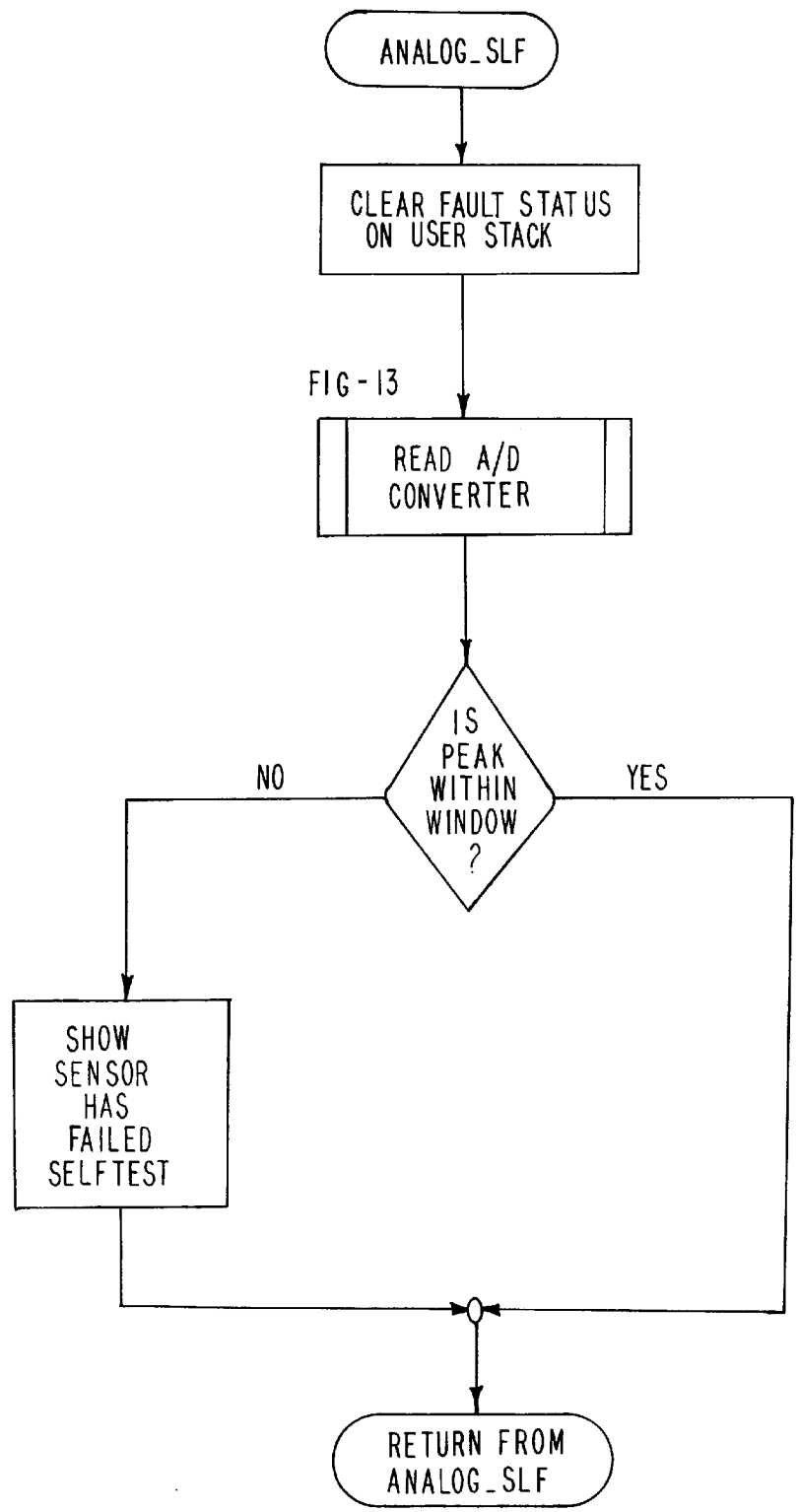
Figure 13:
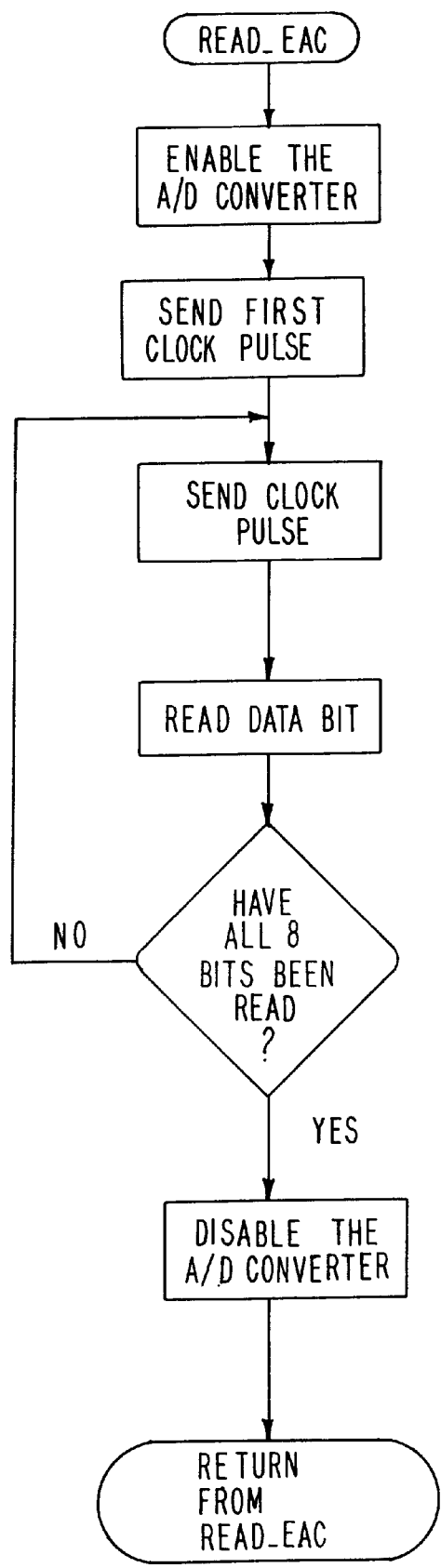
Figure 14:
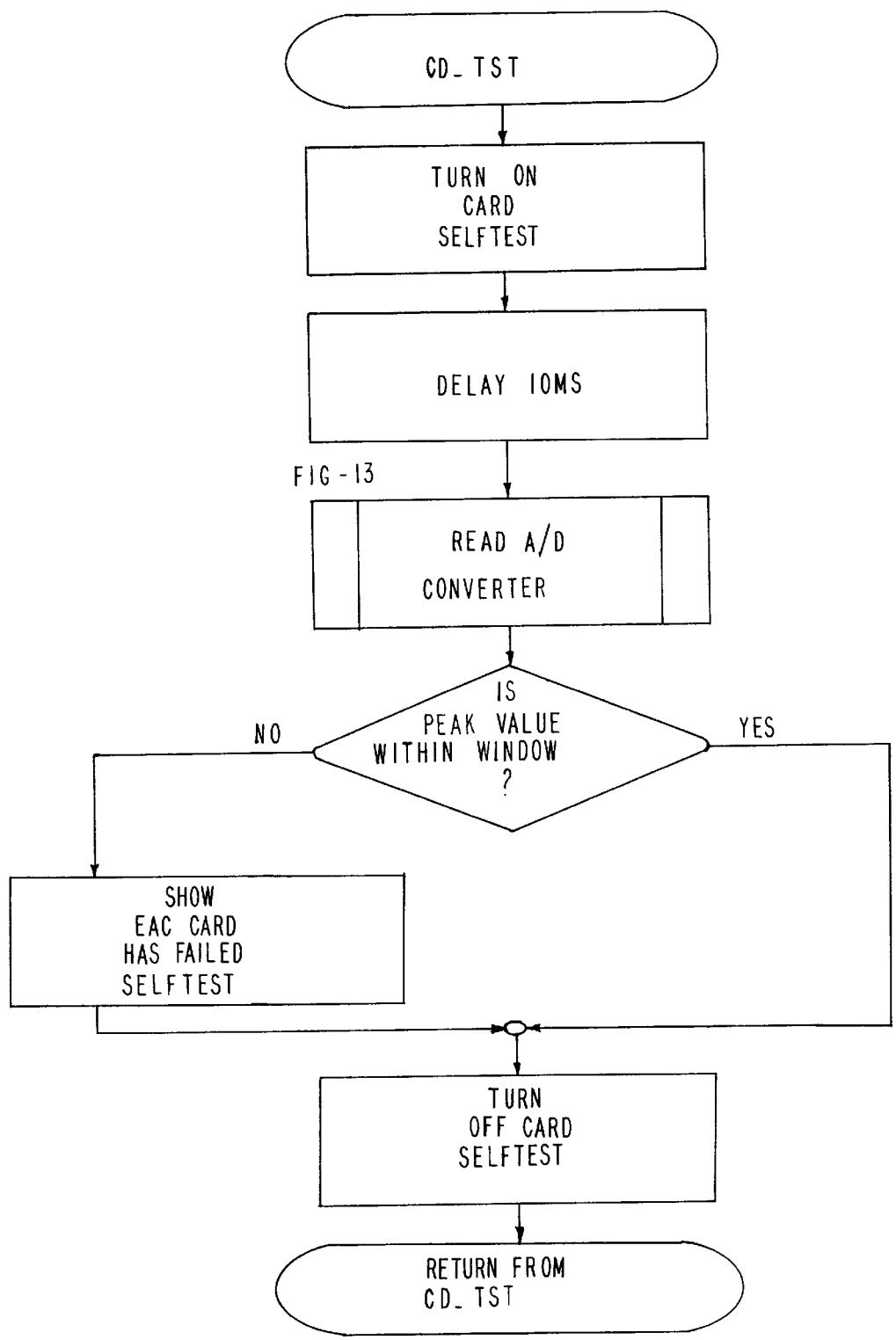
Figure 15:
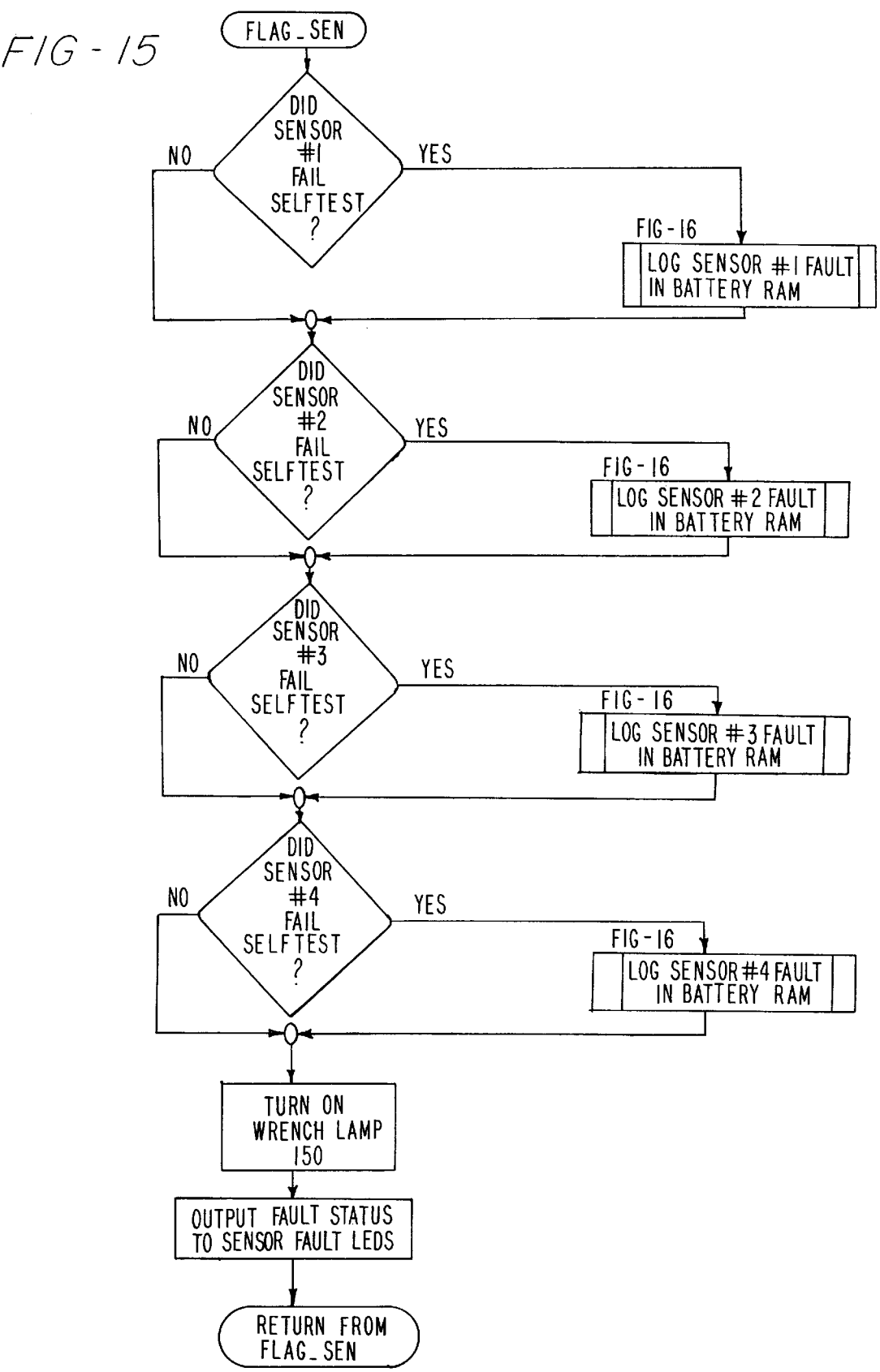
Figure 16:
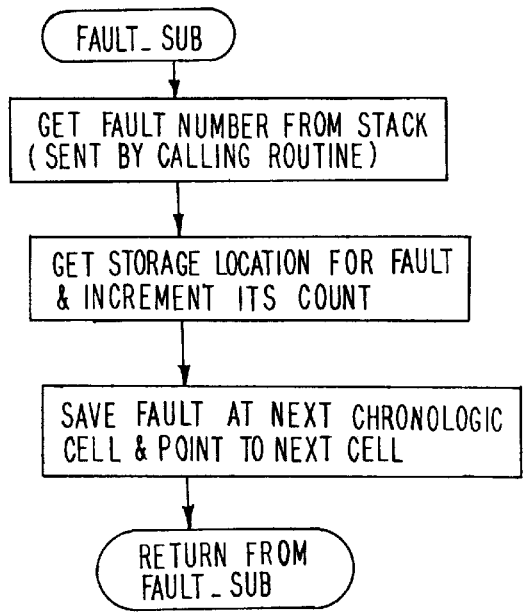

FIG. 9 describes the general testing of each sensor,

FIGS. 10 and 11 describe the digital test of each sensor,

FIG. 12 is the analog testing procedure,

FIG. 13 is the routine for reading the digitized analog value of the magnetic field detected by each sensor, FIG. 14 is the routine for confirming that the analog value is within in predetermined limits, FIG. 15 indicates the sensor that failed a test, and FIG. 16 is the routine for logging the identity of the failed sensor in a battery powered RAM; and FIGS. 17–24 are software flow diagrams showing the routines used in run-time diagnostics.

Figure 24:
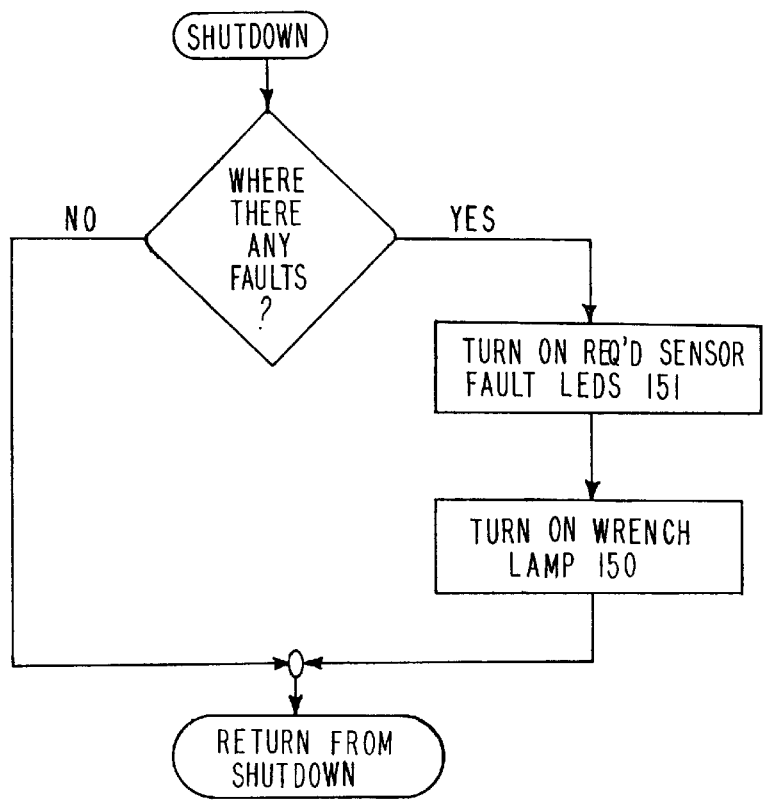
Figure 17:
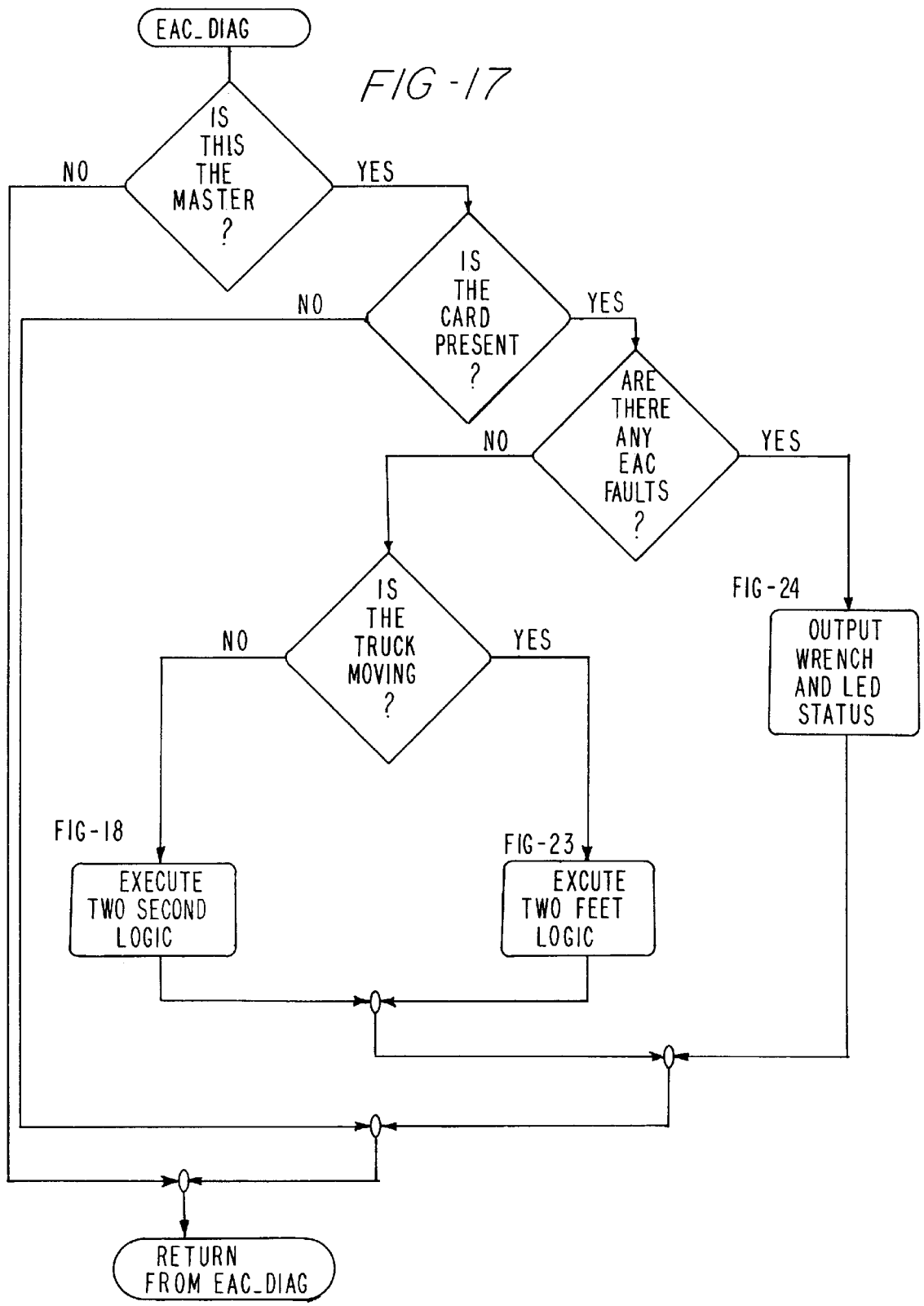
Figure 18:
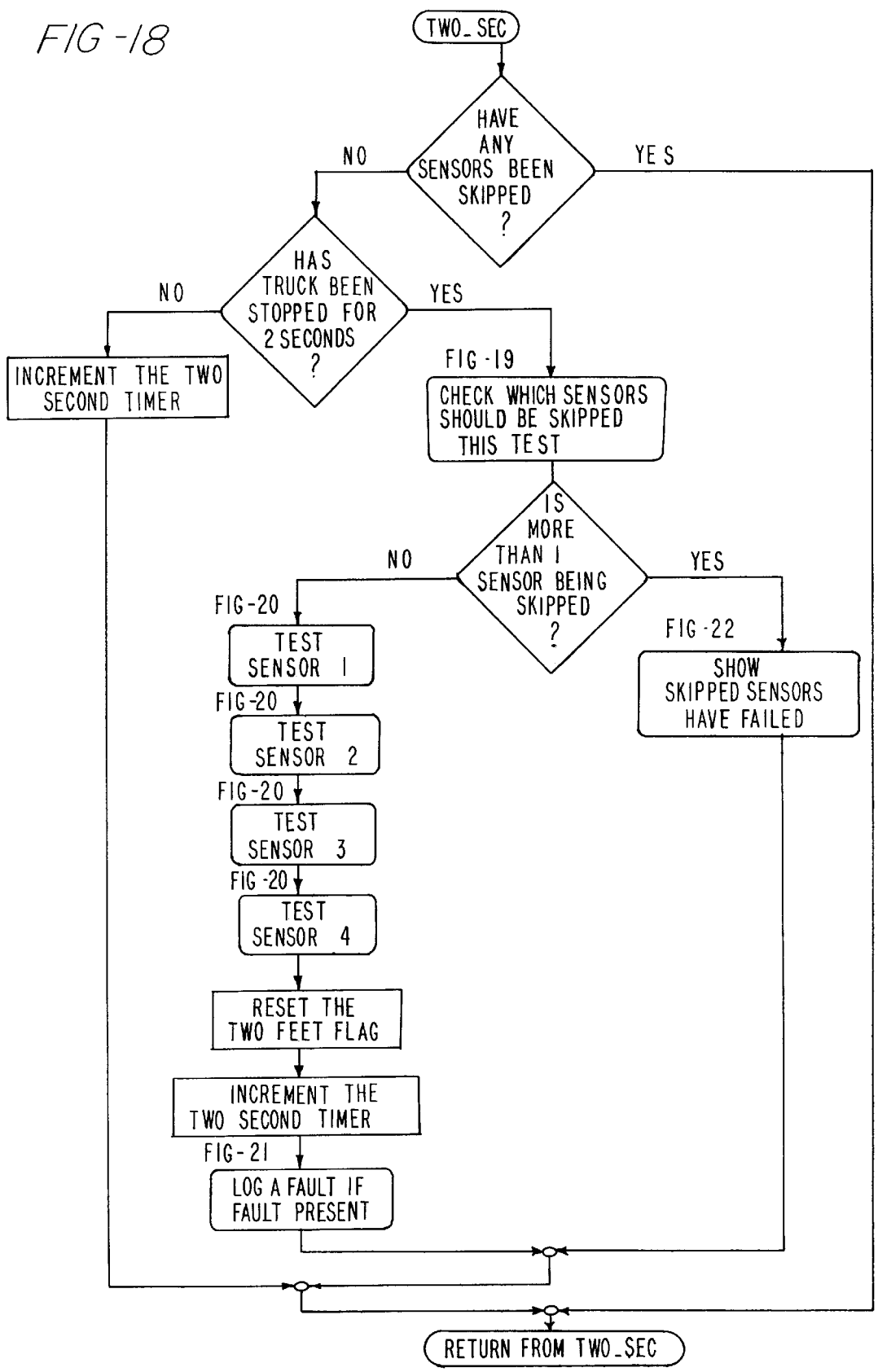
Figure 20:
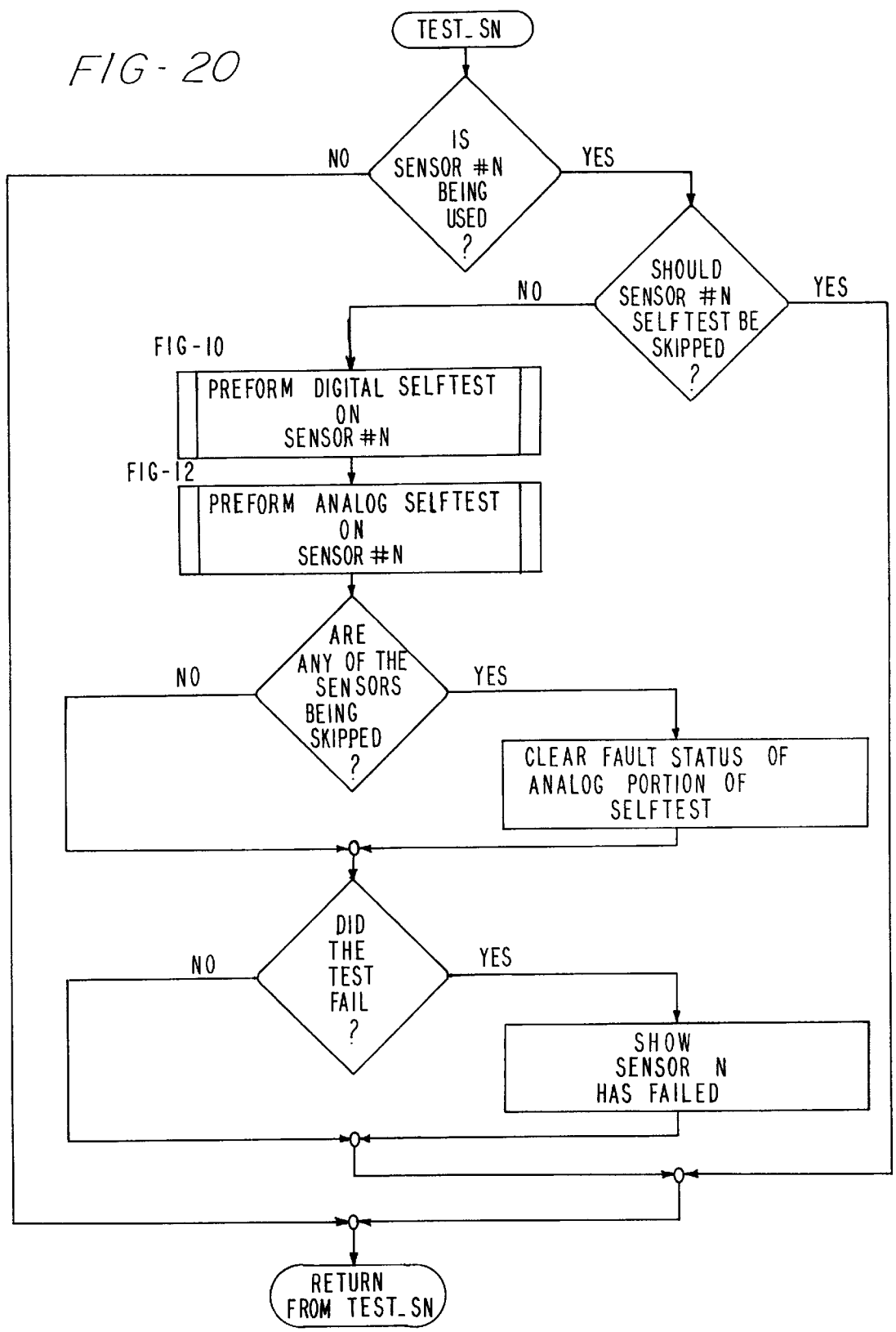
Figure 21:
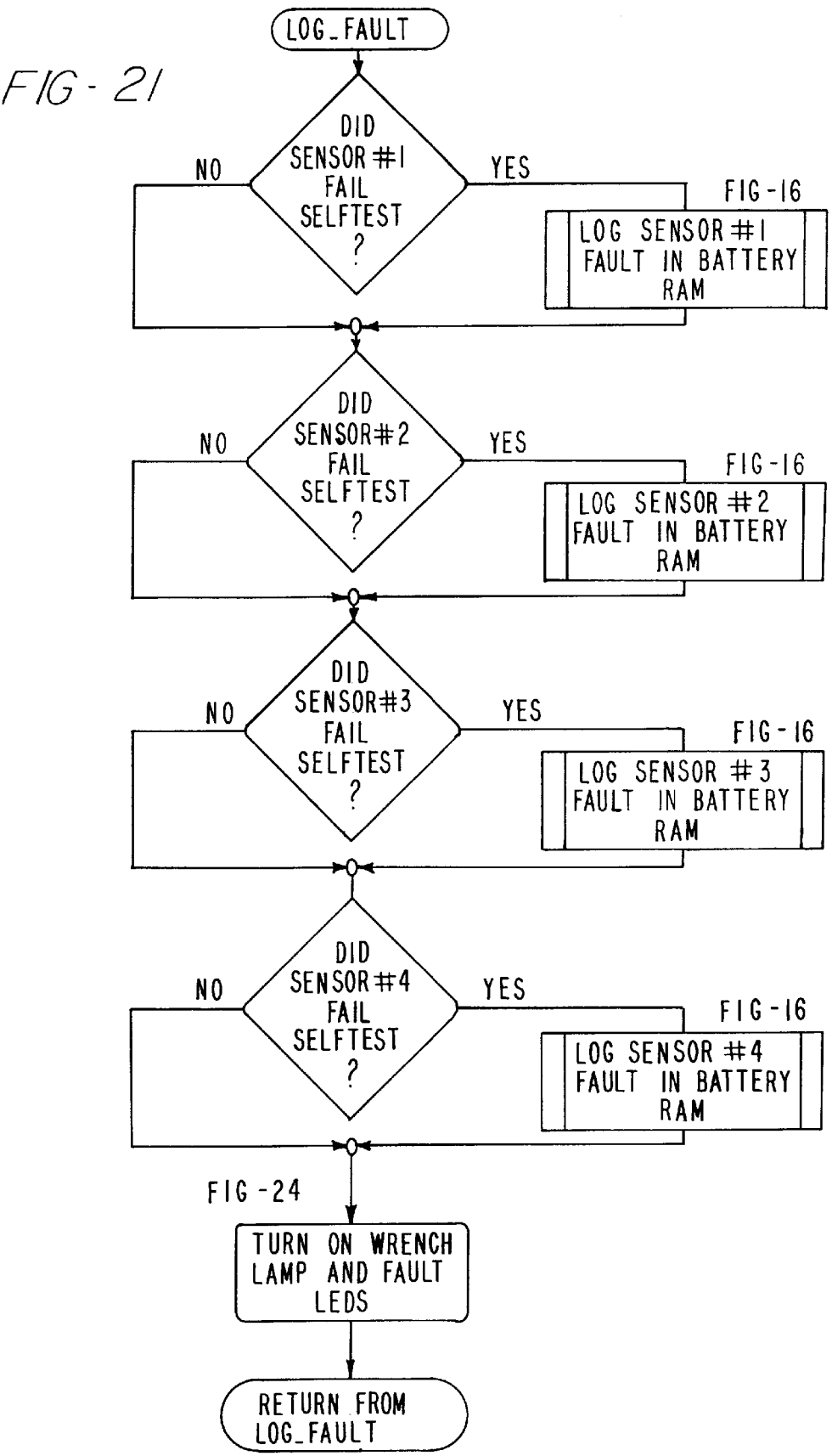
Figure 22:
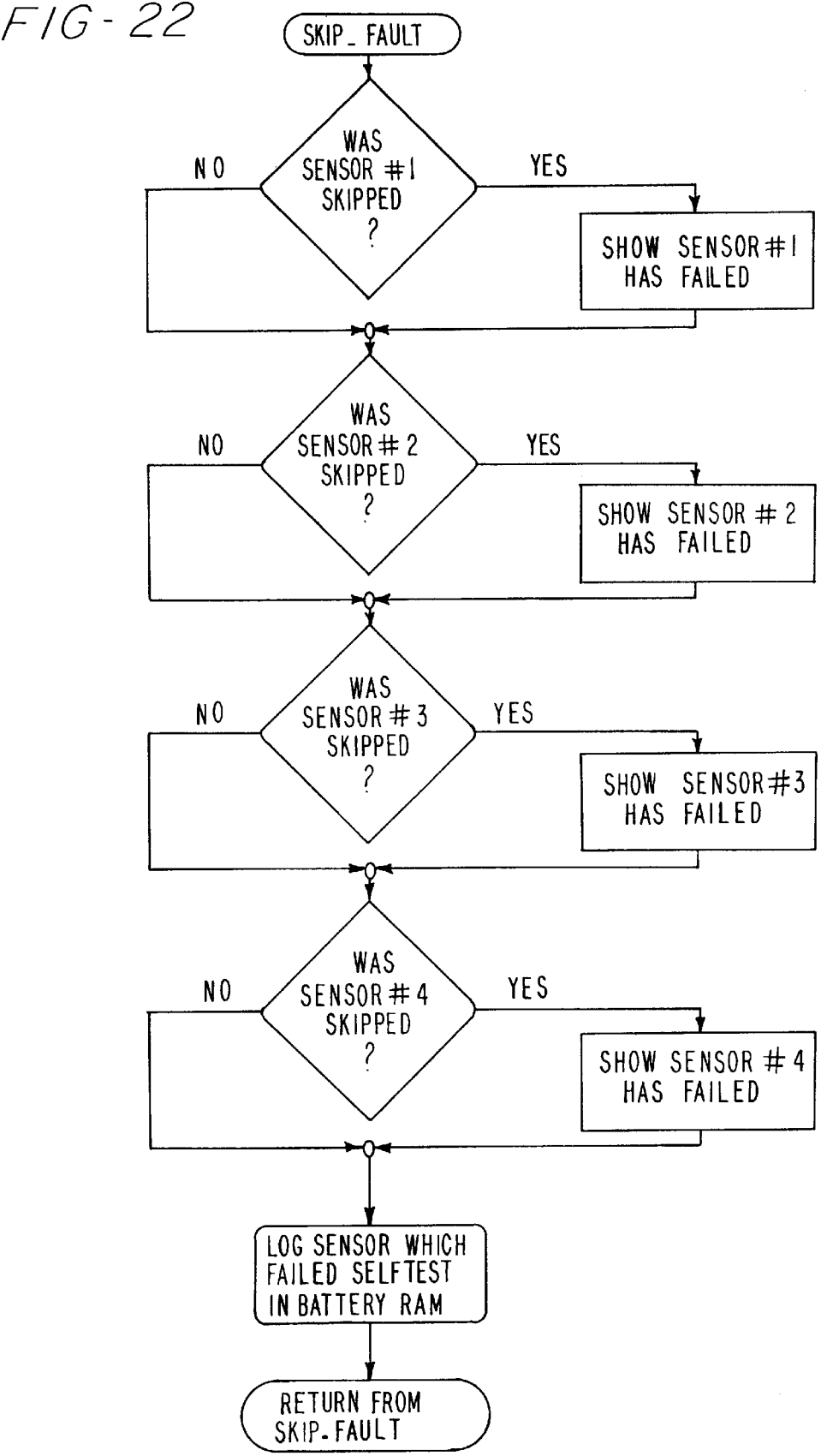
Figure 23A:
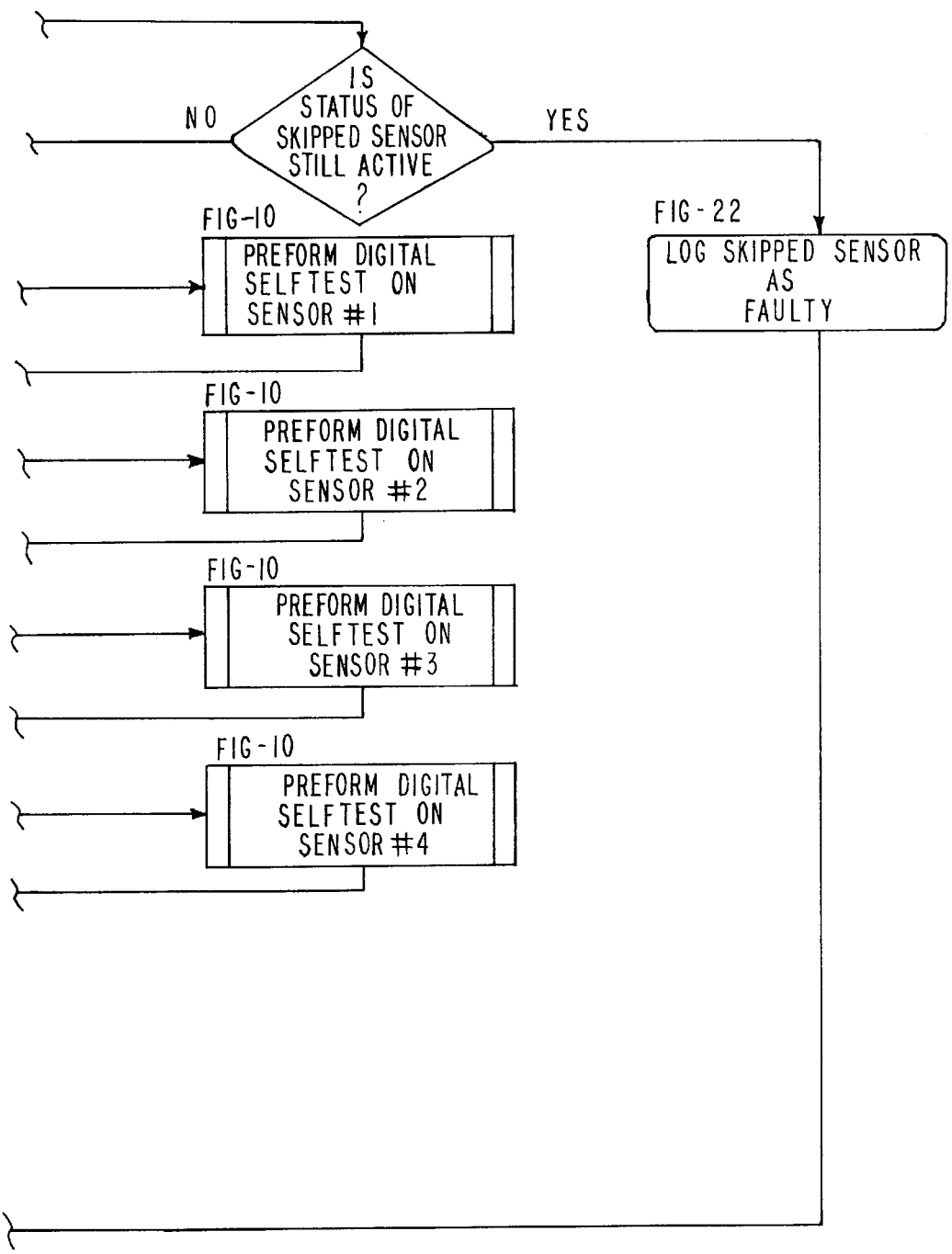

FIG. 17 is the overall routine which is repeatedly executed by the vehicles computer, FIG. 18 is the routine used to execute a self testing procedure whenever the vehicle has been stopped for two seconds, FIG. 19 is used to select the sensors to test and to bypass the testing of any sensor detecting a magnet during the testing routine, FIG. 20 runs the test of selected sensors, FIG. 21 is a routine to log any faults detected, FIG. 22 is a routine to show skipped sensors have failed test, FIG. 23 is a routine used to test those sensors that have previously been skipped because of being active, and FIG. 24 is the routine followed to indicate the existence or faults.

DESCRIPTION OF THE PREFERRED EMBODIMENT

Figure 1:
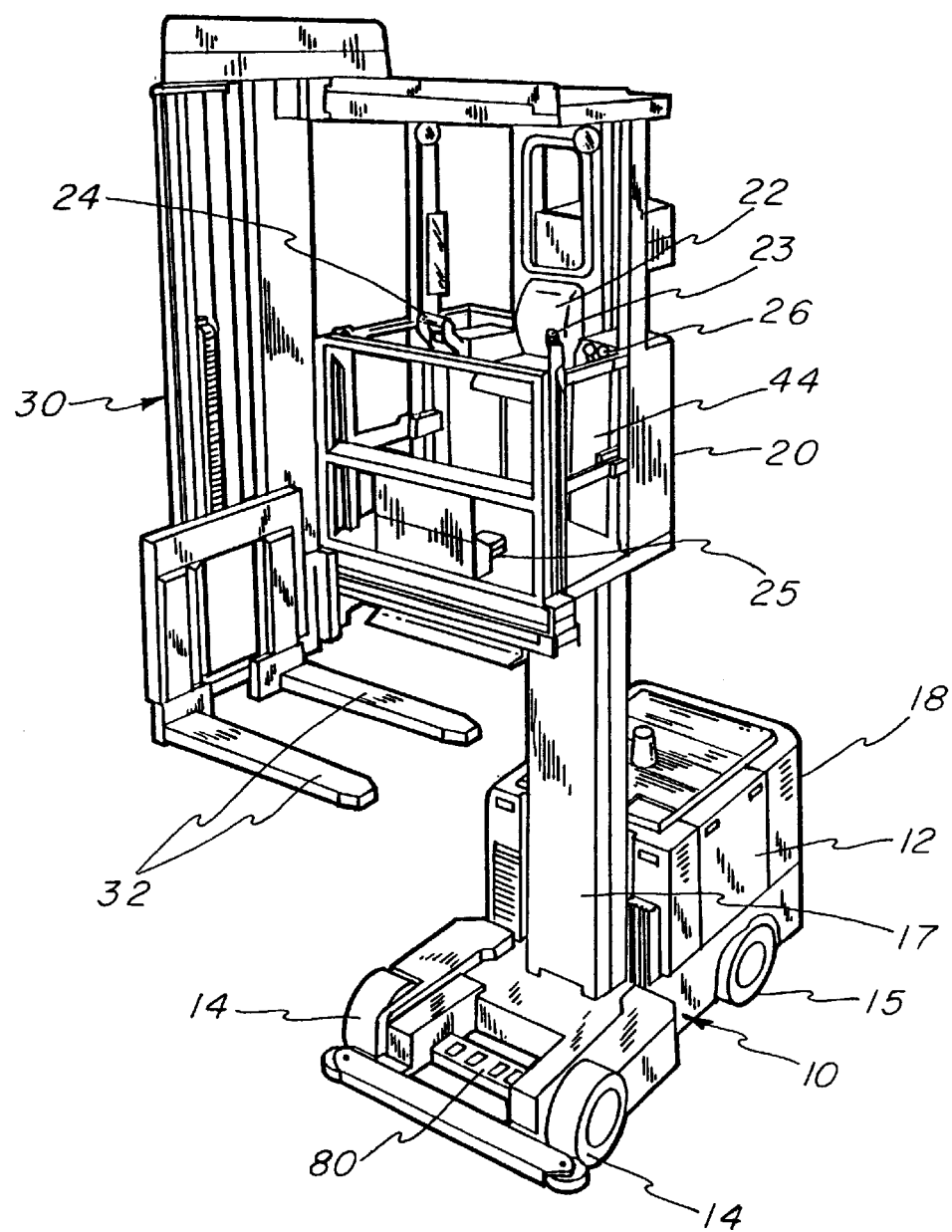
FIG. 1 is a perspective view of a materials handling vehicle employing the buried magnet detection system of the present invention.

Referring now to the drawings, and particularly to FIG. 1 which illustrates a materials handling vehicle or truck of the type that may include either wire guidance or rail guidance. The truck, such as a turret stockpicker, typically includes a power unit 10, a platform assembly 20, and a load handling assembly 30.

Figure 2:
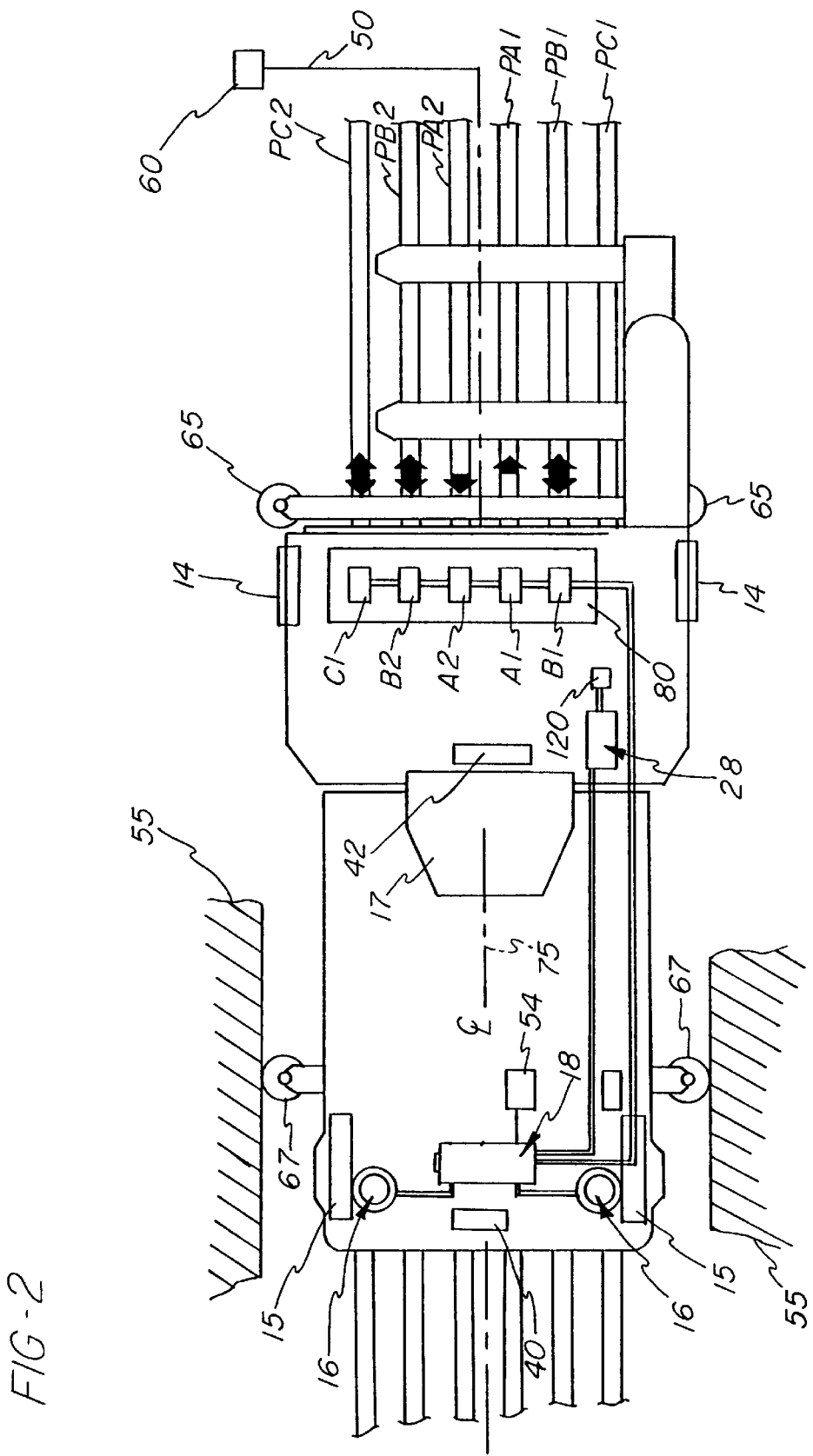
FIG. 2 is a schematic plan view of a materials handling vehicle showing the location of the components comprising the end of aisle control circuitry of the present invention.

The power unit 10 includes a power source, such as a battery unit 12, a pair of load wheels 14 positioned under the platform assembly, a pair of steered wheels 15 positioned under the rear end of the power unit 10 with each wheel being driven by a traction motor 16, a mast 17 on which the platform assembly 20 rides, and a power unit electronic control unit that includes a microprocessor 18 (as shown in FIG. 2).

The platform assembly 20 includes a seat 22 from which the operator can control a steering tiller 23, traction motor control 24, brake pedals 25 and forklift controls 26. The platform assembly 20 includes an electronics package 28 (FIG. 2) which is interconnected with the microprocessor 18 by means of appropriate electrical cables.

The load handling assembly 30 includes a pair of lift forks 32 which may be raised and lowered and also rotated relative to the platform assembly by means of the controls 26.

Figure 3:
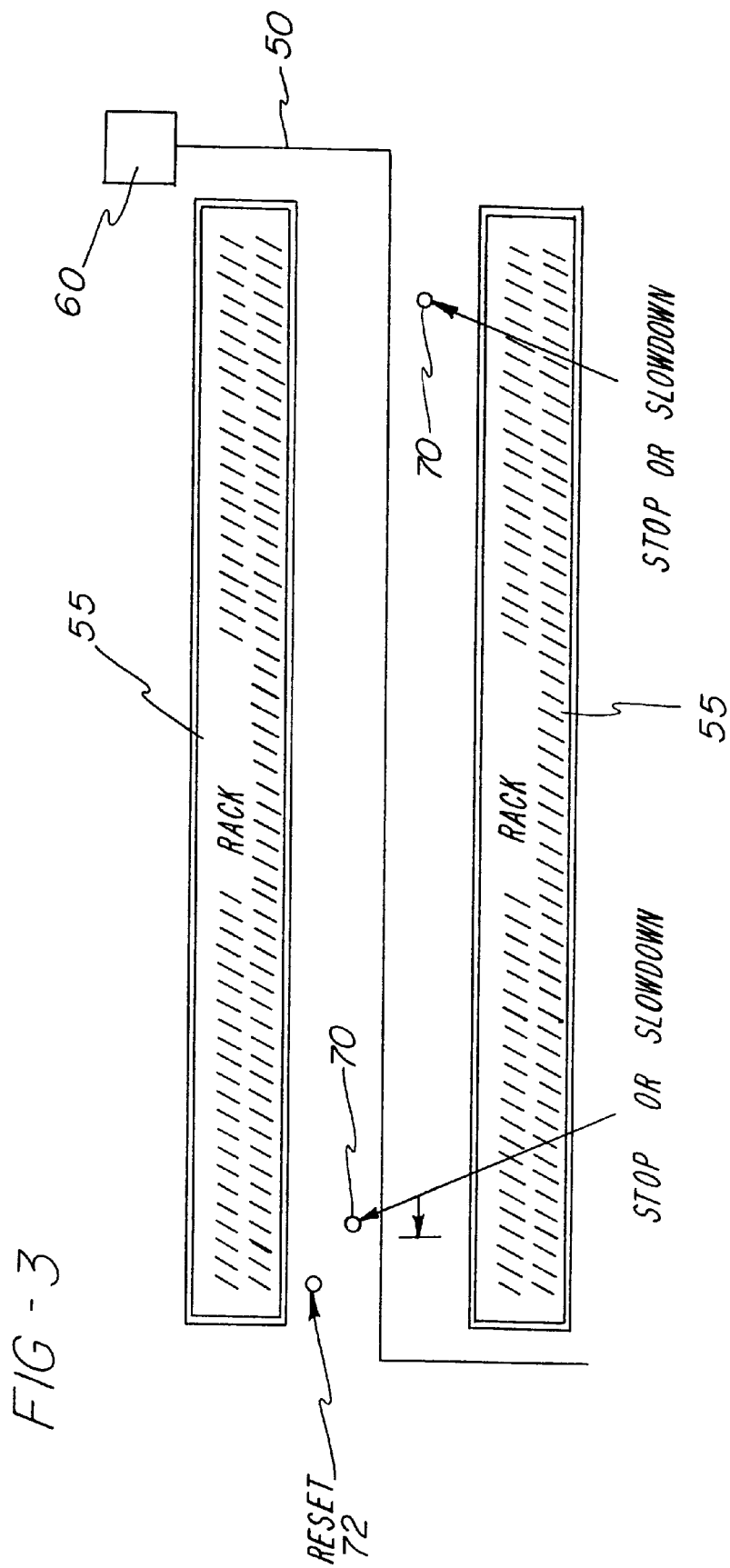
FIG. 3 is a plan view of a representative warehouse showing a buried wire for vehicle guidance and buried magnets near the end of the aisle.
Figure 4:
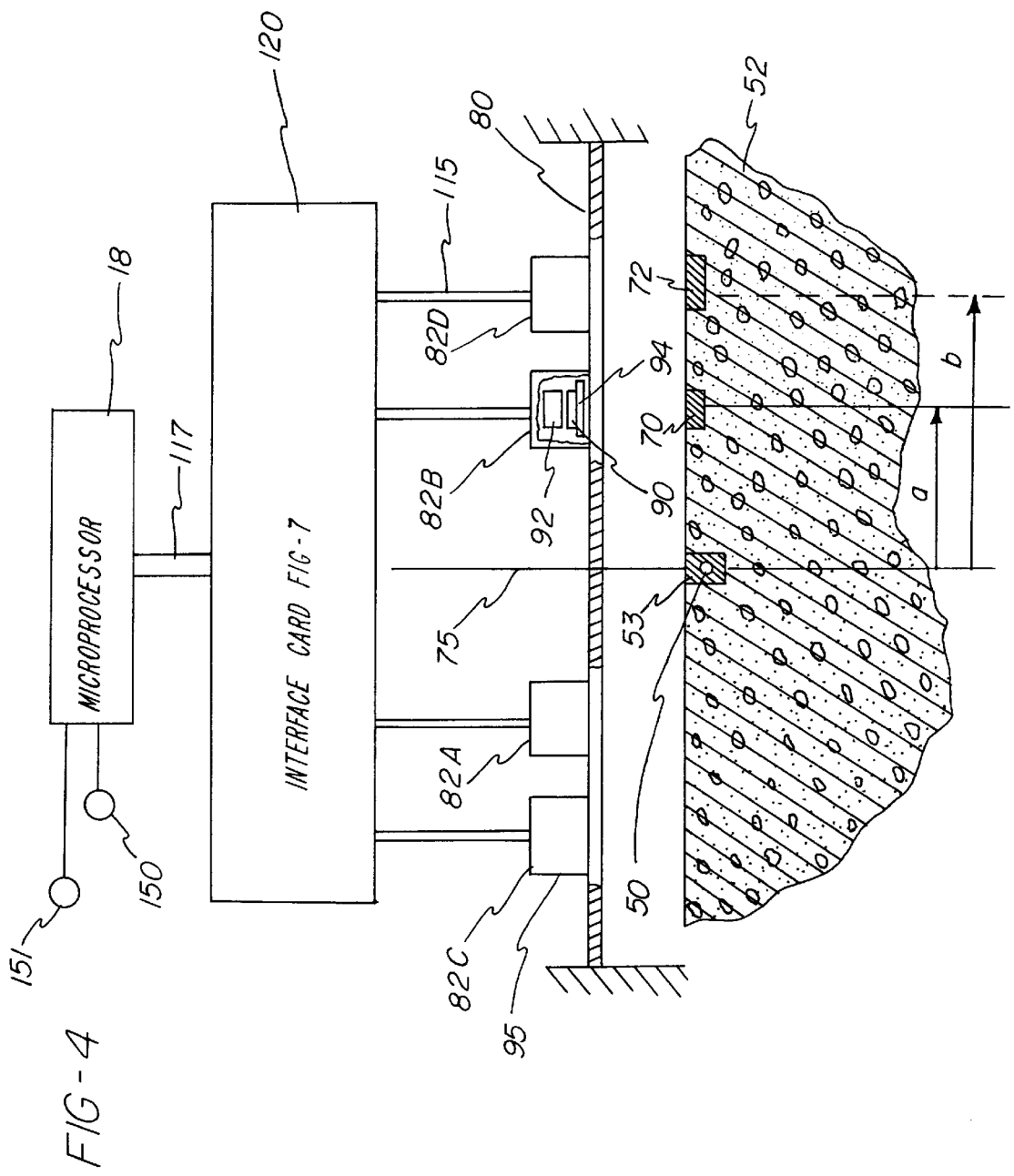
FIG. 4 is a block diagram of a buried magnet detection system.

For wire guidance, the power unit 10 supports two sensor bars 40 and 42 (FIG. 2). Sensor bar 40 is located between the steerable wheels 15 while the sensor bar 42 is placed near the mast 17. Both sensor bars are designed to detect a wire 50 embedded in the floor 52 of a warehouse, as shown in FIGS. 3 and 4. Vehicle direction of travel and distance traveled is sensed by tachometer 54.

When used in the wire guidance mode, the wire 50 is placed down the center of narrow aisles between storage racks 55 in the warehouse, as shown in FIG. 3. A line driver 60 causes current to pass through the wire at a frequency in the range of from 4–12 kHz. As shown in FIG. 4, the wire 50 is embedded in a saw cut in the floor 52, and it is held in place by epoxy 53 which fills the remainder of the cut after the wire has been placed in the bottom thereof. The wire will radiate a signal which is detected by sensor coils (not shown) carried by the sensor bars 40 or 42.

For rail guidance, the truck is provided with fixed guide rollers 65 mounted at the platform end of the truck and rollers 67 placed just ahead of the steered wheel 15. These rollers engage rails mounted on the racks 55. The rollers 67 actuate spring loaded switches (not shown) when the vehicle is properly positioned between the racks. These switches will cause the electronics package 18 to permit the steered wheels to be disengaged and to allow the vehicle to be guided solely by the rails on the racks.

For both wire and rail guidance systems, magnets 70 are buried in the warehouse floor 52 are used to control various functions, depending on a particular application. A typical magnet is approximately 3 inches long by 2 inches wide by 1 inch thick with its north magnetic pole ¼ inch under the floor surface. As shown in FIG. 2, the magnets are placed in one of up to six paths that may be used in any particular application. For example, paths PA1 and PA2 are normally used for End-Aisle magnets, paths PB1 and PB2 are used for Auto-Resume magnets, and paths PC1 and PC2 are used for End-Aisle-Blocked magnets.

The centers of the magnets in paths PA1 and PA2 are placed a distance "a" (approximately 8 inches) on either side of the center line 75, the centers of any magnets in paths PB1 and PB2 are placed a distance "b" (approximately 12 inches) from the center line, and the centers of any magnets in paths PC1 and PC2 are placed a distance "c" (approximately 16 inches) from the center line 75 of the vehicle.

A buried magnet sensor bar 80 is shown positioned between the load wheels 14 of the truck 10 in FIG. 1. This bar carries one or more buried magnet sensing means or sensors 82. Magnet sensors, such as Hall effect devices, are employed and are preferably mounted for lateral adjustment on the bar 80 on either side of the center line 75 of the vehicle.

The sensors 82 are placed approximately 1 inch above the floor. As shown in FIG. 2, sensors 82 include sensors A1 and A2 positioned to detect the magnets 70 in paths PA1 and PA2, sensors B1 and B2 positioned to detect magnets 70 in paths PB1 and PB2, and sensor C1 positioned to detect magnets 70 in paths PC1 and PC2. One example of a magnet sensor bar is shown in copending U.S. patent application Ser. No. 07/682,283, filed Apr. 9, 1991 now abandoned, and an example of how the sensors are used in an end of aisle control system is shown in copending U.S. patent application Ser. No. 07/682,832, filed Apr. 9, 1991, both assigned to the same assignee as the present invention. In one embodiment of this invention, only four magnet sensors are employed, so the bar 80 will carry either sensor B2 or C1 but not both.

Figure 5:
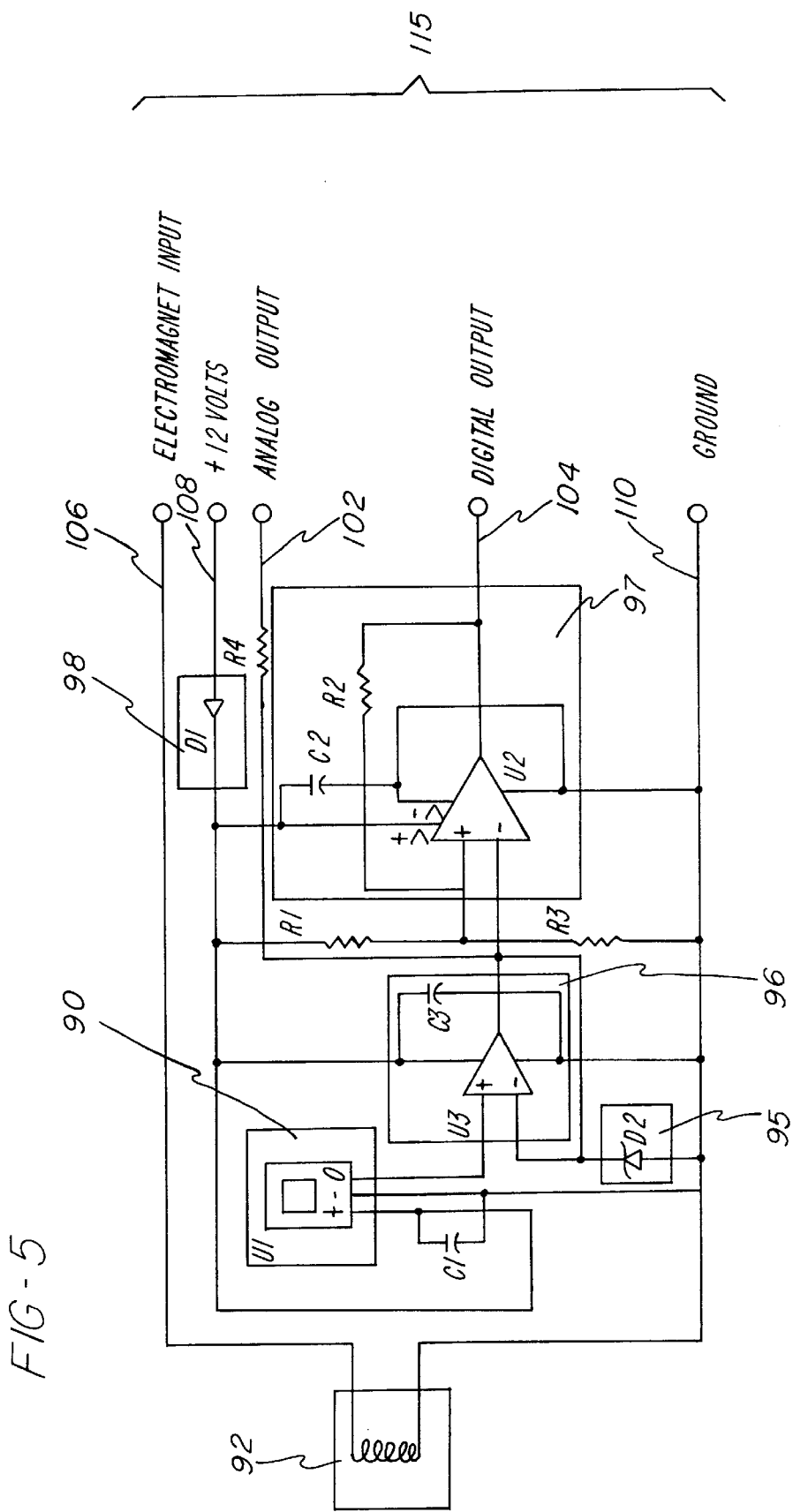
FIG. 5 is a schematic electrical diagram of an individual buried magnet sensor circuit.

Each of the sensors 82 (FIG. 6) includes a housing 87 containing a Hall effect device 90, an electromagnet 92, and a circuit board 94. Referring now to the electrical schematic diagram of the buried magnet sensor circuit in FIG. 5, this circuit includes an overvoltage protection circuit 95, a buffer 96, a threshold detector 97, and a sensor protection device 98.

The output from the buffer 96 is an analog voltage on line 102 representative of the strength of the magnetic field detected by the Hall effect device 90. The threshold detector 97 provides an indication on digital output line 104 that the magnetic field detected is above some minimal value, thus indicating that a magnet is present in the vicinity of the sensor. The electromagnet 92 may be energized from time to time by a current provided on line 106 to determine the operational fitness of the Hall effect device. Power to the sensor circuit is provided on line 108 and the circuit is grounded via line 110.

The electromagnet 92 is 800 to 1000 turns wound on a bobbin having a diameter of approximately 0.465 inch and a length of approximately 0.300 inch; it is designed to provide a magnetic field of 125 gauss. In the preferred embodiment shown in FIG. 5, resistor R1 is 18K ohms, R2 is 1M ohm, R3 is 4K ohm, and R4 is 1K ohm; capacitors C1, C2 and C3 are 0.01 µF; diode D1 is an IN4004; diode D2 is a 5.1 volt zener diode; the buffer U3 is a CA314ORE; and threshold detector U2 is an LM211. In this configuration, the threshold detector 97 will provide an output indicating when the detected magnetic field exceeds 100 gauss and will thereafter disable that output whenever the field strength falls below 80 gauss.

Figure 6:
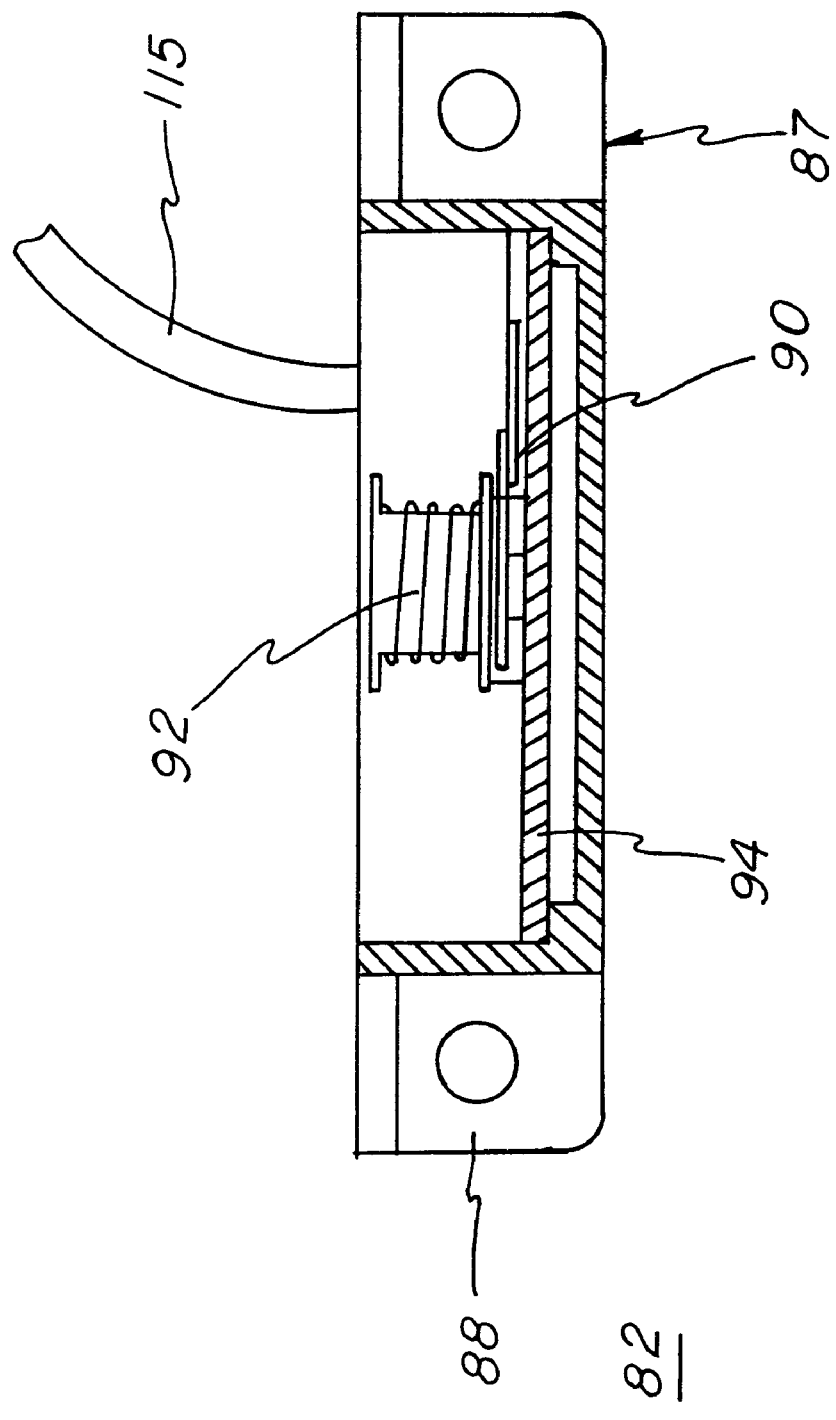
FIG. 6 is a cross sectional view of a buried magnet sensor showing the relationship between a Hall effect device and a test electromagnet.
Figure 7:
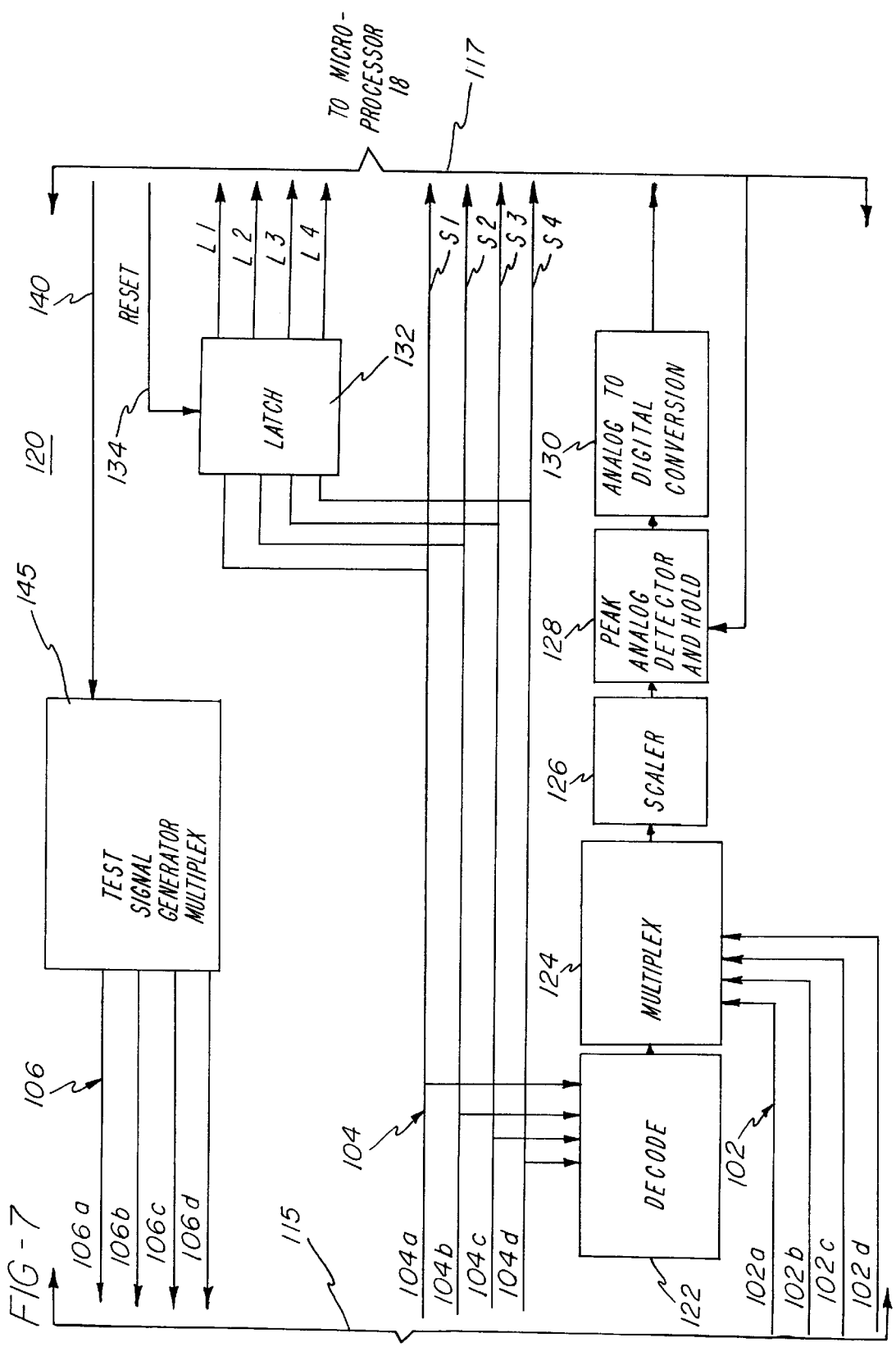
FIG. 7 is a block diagram of an interface card that connects each sensor with the microprocessor controlling the vehicle.
Figure 8:
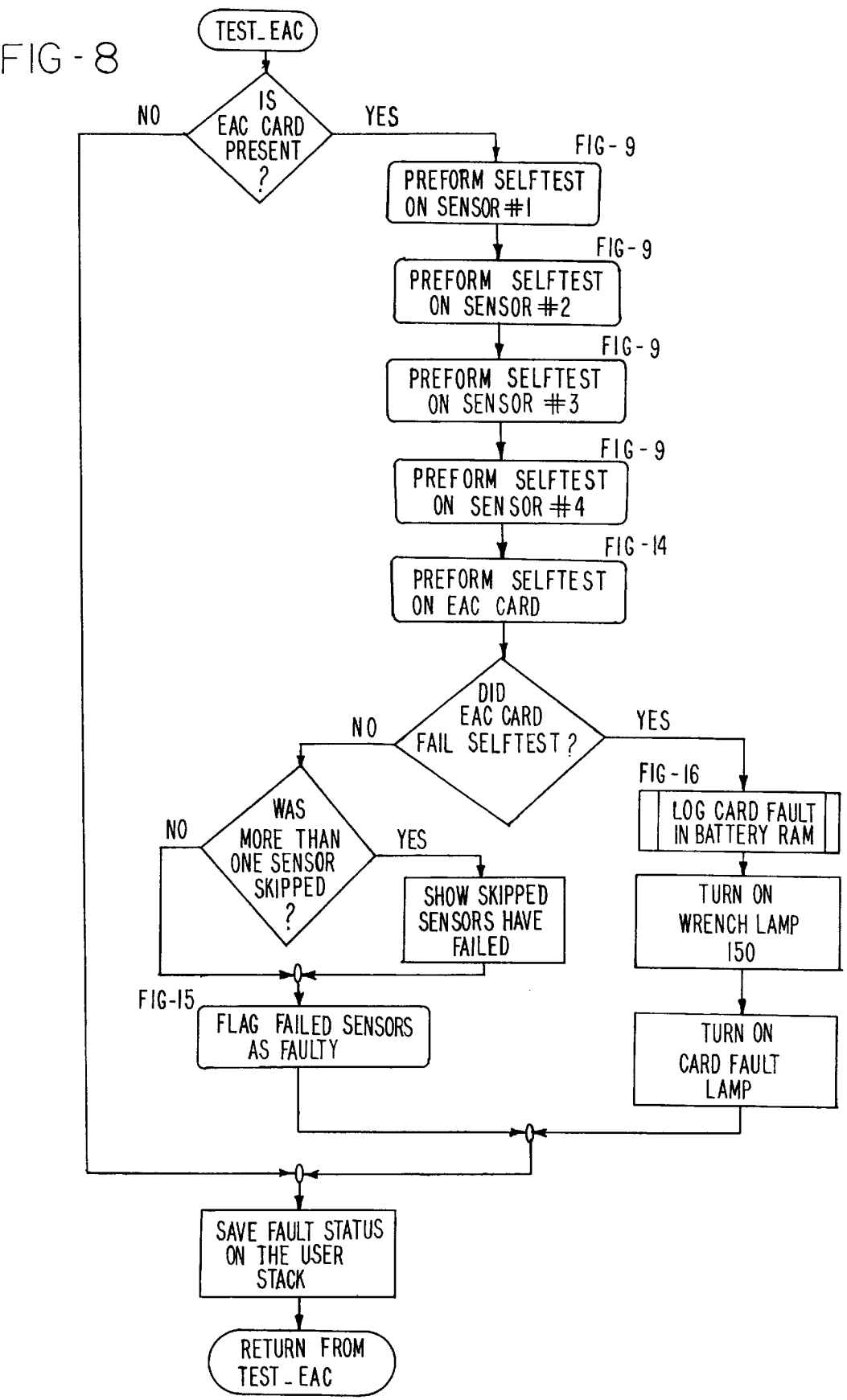
FIGS. 8–16 are software flow diagrams of the self test function performed each time the vehicle is powered up.

As shown in FIG. 6, each sensor 82 includes a housing 87 provided with suitable mounting tabs 88 having mounting holes for attaching the sensor to the bar 80. Both the Hall effect transducer 90 and the electromagnet 92 are mounted on the printed circuit board 94. A cable 115 extends from the top of the housing 87 to an interface card 120 (FIGS. 4 and 7). The interface card 120 is connected to a microprocessor circuit 18 that controls the operation of the vehicle via cable 117.

The interface card 120, shown in the block diagram of FIG. 7, connected to each of the sensors 82 via cable 115, includes a decode circuit 122 connected to the "digital" outputs on lines 104a–104d from the threshold circuit 97 in each sensor 82 for indicating which one of the sensors has detected a magnet. The output of the decode circuit 122 controls a multiplex circuit 124 which directs the "analog" signal on lines 102a–102d from the buffer 96 of the active sensor to a scaler 126.

When a sensor 82 has detected a magnet, it is usually because the vehicle is in motion or because the microprocessor 18 has called for a test of that sensor. In either case, the peak analog value of the magnetic field sensed is determined and stored in a peak analog detector and hold circuit 128 which stores the value of this signal and applies this signal to an analog-to-digital conversion circuit 130 and this value is made available to the microprocessor and compared to previously established values.

The digital signals on lines 104a–104d are made continuously available to the microprocessor 18 on status line S1–S4, and these signals are also applied to a latch circuit 132, and the latched outputs are also made available to the microprocessor 18 on lines L1–L4. The latch circuit may be reset by the microprocessor via reset line 134.

When the microprocessor 18 calls for a test of the Hall effect devices, a signal on line 140 is sent to a test signal generator 145 which provides a source of constant current on lines 106a–106d to energize the electromagnets 92 in the sensors 82 one at a time in sequence. In the preferred embodiment, the generator 145 is a 100 mA constant current supply.

The digital output of the threshold detector 97 is either on, indicating the presence of a magnetic field, or off, indicating that the sensor no longer detects a magnetic field. The transition of the threshold detector's output from off to on is sensed by the decode circuit 122 and identifies the device that is sensing a magnetic field. This transition also causes the hardware circuits of FIG. 7 to monitor the analog value of the sensor through the multiplexer 124. When a transition from on to off is detected, the peak value is stored in the peak analog detect and hold circuit 128 and then converted to digital format by circuit 130 and made available to the microprocessor 18.

A self testing procedure is initiated at predetermined occasions to determine the operability of the sensors used in the aisle guidance system. Each sensor used by the system is normally tested on initial power up of the vehicle, and thereafter whenever the vehicle has come to a complete stop for a predetermined period of time, such as two seconds.

Self testing will not be performed on any given sensor if the output from its threshold detector is HIGH or ON at the beginning of the test, indicating that the sensor is active, since that would indicate that a buried magnet is probably beneath that sensor. This active sensor will be tested later, after the vehicle has traveled a predetermined distance sufficient to ensure that the sensor is far enough away for the magnet to be de-activated, as indicated by tachometer 54. In the preferred embodiment, moving the vehicle two feet is sufficient.

While several sensors are shown and may be physically present on the vehicle, only those sensors that have been programmed to be used in the aisle guidance system will be tested. The sensor testing procedure includes two parts, a digital test and an analog test.

The digital testing procedure basically includes passing a current through the coil 92 to create a momentary test magnetic field, and determining whether the output of its threshold detector 97 is ON or HIGH via one of the status lines 104a–104c, also designated S1–S4. The latched signal on one of lines L1–L4 from latch circuit 132, which is generated by the falling edge of the digital signal, is monitored to verify that it remains inactive while the coil 92 is energized. When the current through the coil 92 is removed, the output of the threshold detector 97 must go LOW or OFF. This is indicated by the latched signal being activated at this time.

The analog test involves reading the peak value of the analog signal created by energizing the coil 92 when performing the digital test. The peak value, which is found at the output of the analog to digital converter 130, is then verified by the microprocessor 18 to be within a range of values chosen to be acceptable given the tolerance of the electronics. If either the digital or analog tests fail, the sensor is considered to be faulty.

The circuit 120 is also tested by applying a known signal to the peak analog detector and hold circuit 128 via line 129 from the microprocessor 18. The digitized value of this signal from circuit. 130 is read by the microprocessor 18 to verify that it is within a range of acceptable values. Of course, if this test fails, then this fact is noted and the sensor tests are ignored.

By this process, the operational fitness of the system is insured. Should the maximum value of the sensed magnetic field deteriorate, it could be a result of sensor failure, the magnet weakening or becoming misaligned, or because the sensor alignment has changed.

Any deterioration of the analog output below a predetermined minimum would be indicated to the operator by an alarm indicator 150 which is on the operator's platform and hereinafter referred to as the wrench lamp since it shows a picture of a wrench (to indicate the need for maintenance) and reduced travel speed (FIG. 4). Also provide are sensor fault LEDs, shown generally at 151, to indicate which sensor, if any, has failed. Further, the failure of a sensor or the card 120 is logged in the memory of microprocessor 18 to permit quick identification by the service technician.

Therefore, there is now some assurance that during normal operation, the presence of a magnetic field from a buried magnet will be detected and the microprocessor will provide the necessary control functions to the vehicle's brakes and traction motor.

Referring now to the software flow diagrams, FIGS. 8–16 describe in detail the process for testing the aisle control system each the time the vehicle is powered up. The microprocessor 18 initiates the test routine identified in FIG. 8 as TEST_EAC, where EAC refers to the end of aisle control function. The first test is to determine whether the EAC card is present, and that refers to the circuit 120, shown in FIGS. 4 and 7. The stacks referred to in these flow charts are memory allocations in the microprocessor 18 itself. The battery RAM is a separate memory circuit having its own battery for retaining fault indications and other data even when the vehicles battery has been removed. The sensor fault LEDs are lamps within the microprocessor 18 and are not normally visible to the operator.

FIG. 9 shows the self test procedure that must be made for each of the selected sensors. In the term "Sn_SLF, the suffix "n" in "Sn" refers to the number of the sensor being tested. Sensor #1 in these flow charts refers to sensor A1 while Sensors #2–#4 refer to sensors A2, B1, and B2 or C1, respectively. Similarly, FIG. 10 is used in the testing of each sensor in turn.

The software flow charts of FIGS. 17–24 describe the run-time diagnostics for the sensors. The routine EAC_DIAG shown in FIG. 17 is run by the microprocessor 18 on a frequent basis to ensure that the aisle control system is functioning properly. As shown, this test is run only if the system is installed on the vehicle. If any faults are found, a lamp on the operator's platform is turned on. This lamp has a wrench symbol to remind the operator that maintenance is required.

If, at the time, the run time diagnostics are run, the vehicle is not moving, then the TWO_SEC procedure of FIG. 18 is executed; if the vehicle is moving, then the TWO_FEET procedure of FIG. 23 is executed.

As shown in FIG. 18, if the vehicle or truck has been stopped for two seconds, the test procedure is run; otherwise it is terminated. If any sensor is presently being used or is active, then that sensor is skipped temporarily, as shown in FIG. 19. If more than one sensor is indicated as being active, then a failure is noted since no two sensors are active at the same time. If one sensor is active, then it is skipped, and the next time the routine is run, the TWO_FEET procedure is run for that sensor, after the vehicle has moved at least two feet (to insure that it is far enough away from the magnet not to be affected).

Faults noted during the testing procedure are recorded in battery RAM in the microprocessor 18. A battery backed up RAM is used to retain the fault data, the strength of the magnets during a calibration procedure and other information regardless of whether the vehicle's battery is installed.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. A method of testing an end of aisle control system for a wire guided vehicle wherein at least one magnet sensor is positioned on an operator controlled materials handling vehicle for detecting magnets installed in the floor relative to a guide wire for indicating a specific location, the method comprising the steps of generating an analog output signal representing the strength of the magnetic field detected by said magnet sensor, generating a threshold output signal for said magnet sensor indicating when the analog output signal therefrom exceeds a first predetermined value, detecting and holding a peak value of said analog output signal generated by said magnet sensor during an interval when said threshold output signal is present, determining whether the peak analog output signal of said magnet sensor exceeds a second predetermined value after a threshold output signal has been generated, and indicating a first fault condition whenever the peak analog output signal from said magnet sensor is determined to be below said second predetermined value.

2. The method of claim 1 further including the steps of:

generating a test magnetic field at said magnet sensor having a field strength approximately equal to the magnetic field strength generated by a buried magnet, comparing said peak analog output to said second predetermined value after said test magnetic field has been turned off, and indicating a second fault condition when said peak analog output is below said second predetermined value.

3. The method of claim 2 further including the step of limiting the speed of the vehicle when either a first or a second fault condition is indicated.

4. The method of claim 1 further including the steps of generating a test magnetic field having a field strength that represents the magnetic field generated by a floor mounted magnet, monitoring the threshold output signal, and indicating a second fault condition if the threshold output signal does not indicate the presence of a magnetic field greater than the first predetermined value while the test magnetic field is present or if the threshold output signal continues after the test magnetic field has been discontinued.

5. The method of claim 4 further including the step of limiting he speed of the vehicle when either a first or a second fault condition is indicated.

6. In an operator controlled wire guided materials handling vehicle including means for guiding the vehicle along a predetermined path defined by a buried wire and means for moving said vehicle, the improvement including:

at least one magnet sensor mounted on said vehicle for detecting a magnetic field emanating from a buried magnet, which indicates a specific location along the path of the vehicle;

circuit means for providing an analog signal representing the strength of the magnetic field detected by said magnet sensor as the vehicle moves along said path;

threshold detecting means for providing a threshold output signal when the analog output of said magnet sensor is above a predetermined magnitude;

means responsive to said threshold output signal for detecting and holding a peak analog output of said magnet sensor during the time a threshold output signal is present;

means for comparing said peak analog output to a second predetermined value; and means for indicating a first fault condition when said peak analog output is below said second predetermined value.

7. The apparatus of claim 6 further including:

means for generating a test magnetic field at said magnet sensor having a field strength approximately equal to the magnetic field strength generated by a buried magnet;

means for comparing said peak analog output to said second predetermined value after said test magnetic field has been turned off; and means for indicating a second fault condition when said peak analog output is below said second predetermined value.

8. The apparatus of claim 7 further including:

means for detecting said threshold output signal, and means for indicating a second fault condition when said threshold output signal is absent and said test magnetic field is being generated or if said threshold output signal does not cease when said test magnetic field is turned off.

9. The apparatus of claim 8 further including means for limiting the speed of the vehicle when either a first or a second fault condition is indicated.

10. The apparatus of claim 6 wherein said magnet sensor is a Hall effect device.

* * * * *

UNITED STATES PATENT AND TRADEMARK OFFICE
CERTIFICATE OF CORRECTION

PATENT NO : 6,009,357

DATED : December 28, 1999

INVENTOR(S) : Timothy A. Wellman, et al.

It is certified that error appears in the above-identified patent and that said Letters Patent is hereby corrected as shown below:

Col. 9, line 5
 replace "he"
 with --the--.

Signed and Sealed this

Thirteenth Day of February, 2001

*Attest:*

NICHOLAS P. GODICI

*Attesting Officer*     *Acting Director of the United States Patent and Trademark Office*